United States Patent [19]
Torii et al.

[11] Patent Number: 5,355,479
[45] Date of Patent: Oct. 11, 1994

[54] INTERFACE CONFORMANCE VERIFICATION SYSTEM

[75] Inventors: Satoru Torii; Etsuo Ono, both of Kawasaki, Japan

[73] Assignee: Fujitsu Limited, Kawasaki, Japan

[21] Appl. No.: 823,115

[22] Filed: Jan. 21, 1992

[30] Foreign Application Priority Data

Jan. 21, 1991 [JP] Japan .................................. 3-020575

[51] Int. Cl.⁵ .............................................. G06F 7/02
[52] U.S. Cl. .................................. 395/600; 371/67.1; 364/DIG. 1; 364/285.4; 364/259.2
[58] Field of Search .................. 364/DIG. 1, DIG. 2; 395/500, 600, 575; 371/19, 67.1

[56] References Cited

U.S. PATENT DOCUMENTS

| | | | |
|---|---|---|---|
| 4,553,261 | 11/1985 | Froessl | 382/57 |
| 4,906,988 | 3/1990 | Copella | 340/825.34 |
| 5,159,548 | 10/1992 | Caslavka | 364/408 |

*Primary Examiner*—Thomas M. Heckler
*Attorney, Agent, or Firm*—Staas & Halsey

[57] ABSTRACT

An interface conformance verification system uses a computer to verify, e.g., the interface between modules in a large computer program or other a verification target. The interface conformance verification system includes an information collector and a verifier. The information collector receives at least one module group made up of one or more modules, collects as identification data pieces of target information on a predetermined operation, and creates sets, each having elements formed of the identification data. For example, the identification data may be a list of all variables declared, referenced or assigned a value in respective modules. Each set may correspond to a module or a plurality of modules. The verifier has a set operating mechanism and judging unit. The set operating mechanism receives at least two sets created by the information collector and performs a predetermined set operation, such as the difference between all variables referenced in one module and all variables having a value assigned in any other module. The judging unit outputs a set operation result showing a relation between corresponding operations judgment standards are used by the judging unit to determine whether to modules or other verification target conforms to predetermined interface rules or other requirements.

10 Claims, 25 Drawing Sheets

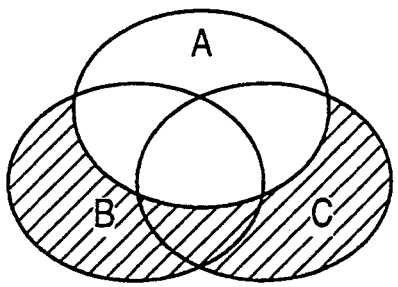
FIG. 18A
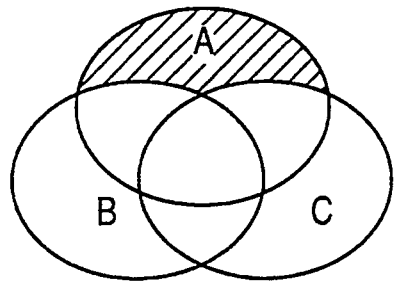
FIG. 18B
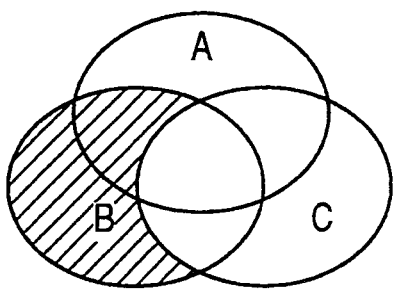
FIG. 18C
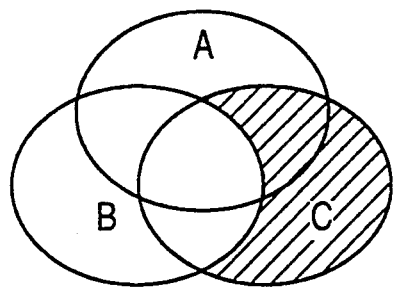
FIG. 18D
FIG. 19
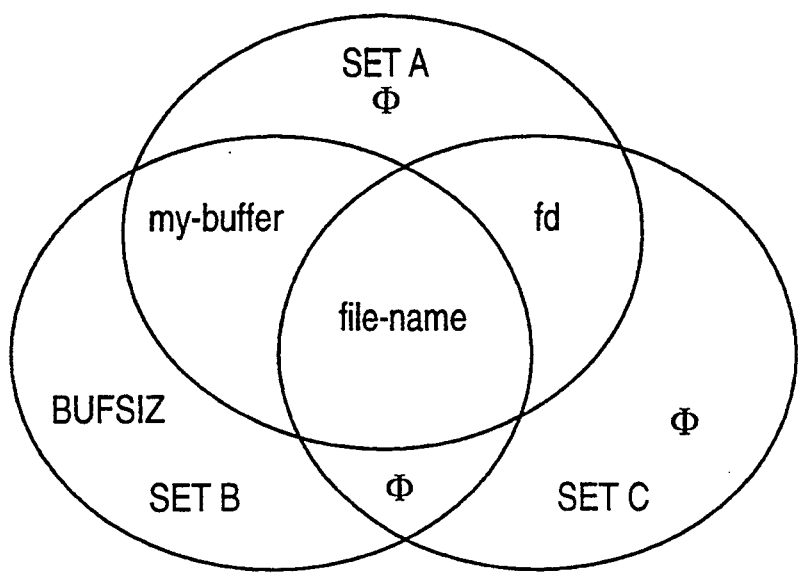

INTERFACE CONFORMANCE VERIFICATION SYSTEM

BACKGROUND OF THE INVENTION

1. Field of the Invention

This invention pertains to an interface conformance verification system for verifying conformance among modules for use in an interface allowing a program module to exchange information with the outside.

It also pertains to a system for realizing a verification of conformance among virtual modules yet to be implemented, between declarations within modules and internal processes, as well as between specifications and programs.

Recent systems have become more variant and larger and are constructed by a plurality of modules each in charge of certain predetermined processing. Those modules interact with each other in executing a task.

When these individually created modules are combined to create a single system, it is necessary to confirm, e.g. by the following verifications, that the correct operational results are obtained according to the specification (pursuant to the request) given to the entire system.

A verification of a desirable module configuration.

A verification of a module matching its specification (design).

A verification of no adverse external effect by each module.

A verification of correct interfaces among modules.

2. Description of the Related Arts

A popular method for developing a larger computer program comprises the following steps:

1. dividing the larger computer program into a plurality of modules;
2. defining the information exchanged among modules as an inter-module interface condition;
3. individually creating respective modules, such that the inter-module interface condition is satisfied;
4. combining the modules; and
5. completing the object program.

It is essential to sufficiently debug errors in the earlier stages of the above sequence of steps by performing independent tests for respective modules, because the more advanced the step of the above sequence of steps, i.e., the later the stage of combination, the more difficult it generally becomes to find not only the errors by themselves but also their causes.

Therefore, it is imperative to confirm that there are no material errors in the modules by sufficiently testing each module singly. However, in executing such a test, because other modules are also in their development stages, the interfaces are tested by checking the program through decoding and by executing a module combination with a temporary module provided for the testing purpose.

However, because the check and the creation of a temporary module are performed only for the processes anticipated with the tested modules and the neighboring modules, there could likely be tests, which fail to be applied, and a larger number of steps are required.

Also, it is possible for a target module to sequentially perform a combination test with other modules having interfaces with the target module, based on the already realized function. In such a case, it is possible to treat, as an earlier described interface conformance problem, a problem of verifying the information that the realized function and the function necessary for a test item satisfy the necessary functions in the temporary combination tests.

Here, however, because there is no set standard for dividing a program into a plurality of modules, the designers make such divisions based on their experiences and on the analyses of the requirement of the problem to be solved. As with the program development problem, it is also possible to treat, as an interface conformance problem, a problem of verifying that a modular division in the system design allows realistic operations according to the actual requirements and that the modular division forms a preferred system configuration.

Not only program development but also other problems can be treated as interface conformance problems similarly to the above descriptions. An example of such problems editing by a word processor. There are problems of finding the effects on other documents caused by an insertion or deletion of control attributes, e.g., for changing the character sizes, fonts, and indentations, in a document.

SUMMARY OF THE INVENTION

An interface conformance verification system of this invention aims at verifying a processing result obtained as a result of combining modules to form a system, at examining the external results without having to actually combine a tested module with others, at detecting an unintended external effect, i.e. a side-effect, outside of the specification, at reducing the cost of verifying the geometrically increased number of combinations among modules, at verifying that the modules are realized according to the given specification without having any unintended effects on other modules, at realizing inter-module verifications during the designing period, and at verifying any effects by an insertion or deletion on other documents in editing a document.

A feature of this invention resides in a computer based interface conformance verification system. The interface conformance verification system verifies the interface conformance of a verification target. The verification target forms a system comprising a plurality of modules. Each module aggregates operations of different kinds and objects. The interface conformance verification system comprises an information collector and a verifier. The information collector receives at least one [1] module group made up of one [1] or more modules, collects as identification data pieces of target information on a predetermined operation, and creates a set whose elements comprise the identification data. The verifier has a set operating mechanism and a judging unit. The set operating mechanism receives at least two [2] sets created by the information collector and performs a predetermined set operation. The judging unit outputs a result of the set operation for a set relation between corresponding set operations.

For a system comprising a plurality of modules, the interface conformance verification system enables easy verification of effects of a module on a system or other modules, differences between a specification of a module and an actual processing program, and interfaces between modules in a designing stage. It contributes greatly to the efficient development of a large scale system.

BRIEF DESCRIPTION OF THE DRAWINGS

Those skilled in the art can easily understand additional features and objects of this invention by referring to the description of the preferred embodiments and the attached drawings.

In the drawings:

FIGS. 18A through 18D are Venn diagrams illustrating relations among three [3] sets used for explaining the preferred embodiments of this invention;

FIG. 19 is a modified Venn diagram illustrating an exemplary result obtained by executing set operations in the preferred embodiments of this invention;

DESCRIPTION OF THE PREFERRED EMBODIMENTS

Explanation of the Underlying Principles

Before going into the details of the preferred embodiments, the underlying principles are explained first.

FIGS. 1 through 5 are block diagrams schematically illustrating various configurations of an interface conformance verification system pursuant to this invention.

Figure 1:
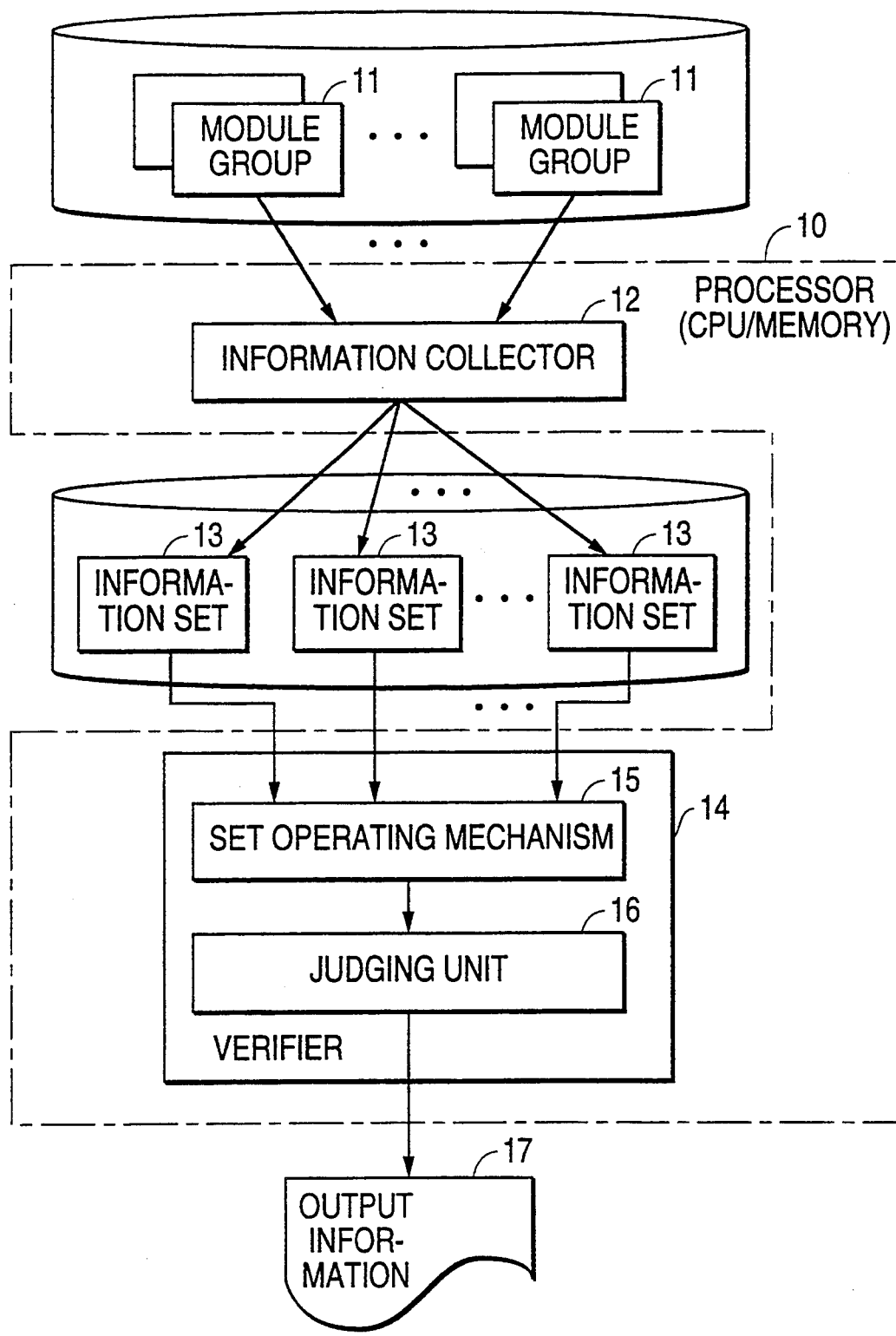
FIG. 1 is a block diagram showing a first configuration of this invention.

FIG. 1 is a block diagram showing a first configuration of this invention.

In FIG. 1, 10 indicates a processor comprising a CPU and a memory, 11 indicates either a module forming a basic unit of a program or a document or a group of such modules, 12 indicates an information collector, 13 indicates a set of information collected by the information collector 12, 14 indicates a verifier, 15 indicates a set operating mechanism, 16 indicates a judging unit, and 17 indicates output information of a verification result.

The interface conformance verification system pursuant to a first form of this invention comprises the information collector 12 and the verifier 14. The information collector 12 collects from one [1] or more of the module groups 11 identification data on target information of a predetermined operation described internally in the module groups 11, and creates an information set 13 for each of the inputted module groups 11.

The predetermined operation may be a command, such as a definition, a declaration, a reference, a set statement or setting, an allocation or a call-up, when a call statement or program is verified. The target information of the predetermined operation may include data, logical functions, and mathematical functions for a variable, an array, or other data structures including a database.

The verifier 14 comprises the set operating mechanism 15 and the judging unit 16. The set operating mechanism 15 receives two [2] or more information sets 13 and performs a predetermined set operation. The judging unit 16 extracts the operation result indicating the relations between corresponding operations for a diagnosis and outputs output information 17 as a verification result in a predetermined format.

FIGS. 6A through 6E show various relations between sets.

More specifically, FIGS. 6A through 6D show relations between two [2] sets A and B.

Figure 6A:
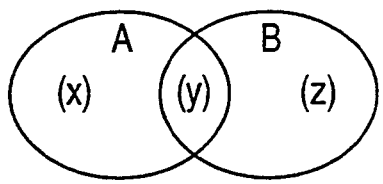
FIGS. 6A through 6E show various relations between sets.

In FIG. 6A, which shows a general relation between two [2] sets A and B, part (x) represents A-B, part (y) represents A∩B, and part (z) represents B-A.

Here, A-B represents the difference set expressing the logical product of set A and set $\overline{B}$, where $\overline{B}$ is the complement of set B; A∩B represents the logical product of set A and set B; B-A represents the difference set expressing the logical product of set B and set A, which is the complement of set A; and A∪B represents the logical sum of set A and set B.

Assuming that A={a, b, c, d} and B={b, d, e, f}, the following sets are obtained.

A∪B={a, b, c, d, e, f}
A∩B={b, d}
A-B={a, c}

Figure 6B:
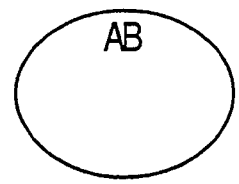
Figure 6C:
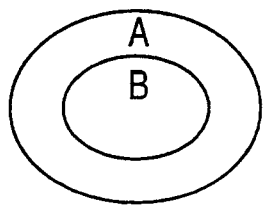
Figure 6D:
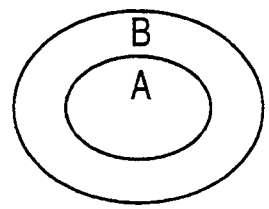

FIGS. 6B, 6C and 6D show special cases of the relation shown in FIG. 6A. More specifically, FIG. 6B shows a case where A=B, FIG. 6C shows a case where B is included in A, and FIG. 6D shows a case where A is included in B.

Figure 6E:
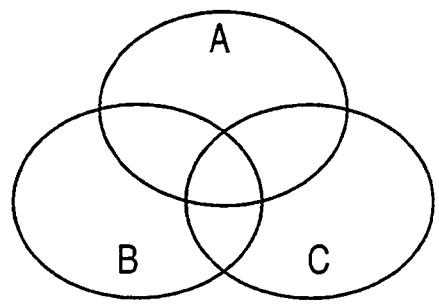

FIG. 6E shows a general relation among three [3] sets, A, B and C.

Although FIGS. 6A through 6D show set operations for two [2] sets A and B, the number of operation targets need not be two [2]. As shown in FIG. 6E, for example, similar relations can be obtained by performing set operations for a plurality of sets numbering more than two [2].

Figure 2:
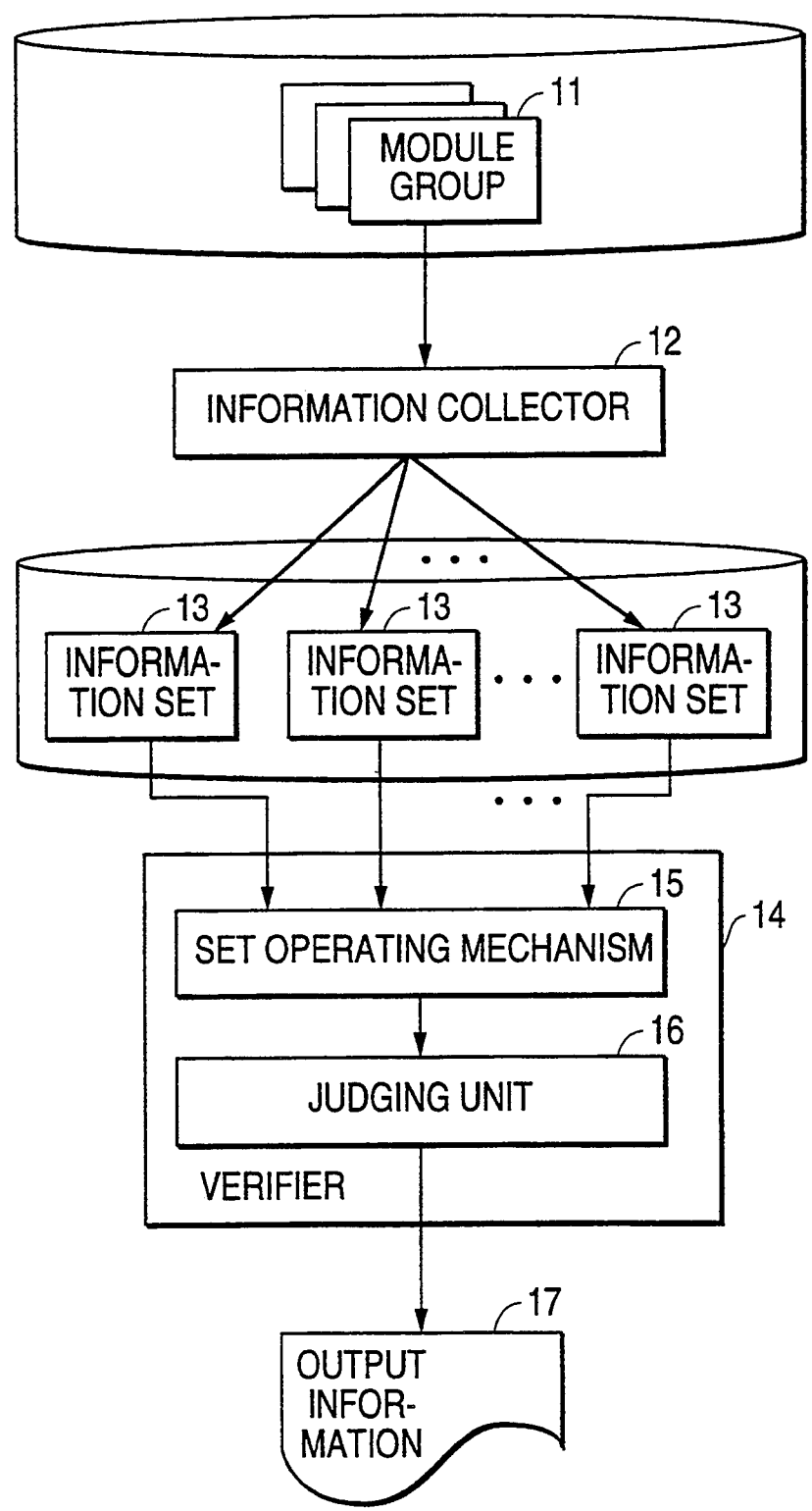
FIG. 2 is a block diagram showing a second configuration of this invention.

FIG. 2 is a block diagram showing a second configuration of this invention.

Elements shown in FIG. 2 which are the same as those shown in FIG. 1 have the same numbers.

The information collector 12 collects from one [1] or more of the module groups 11 identification data on target information a variable: data on an array, a data structure or a database: a logical function; or a mathematical function) for each predetermined operation (a definition, a declaration, a reference, a setting, an allocation or a call-up) described internally in each of the module groups 11, and creates an information set 13 whose elements comprise the collected identification data.

The verifier 14 comprises a set operating mechanism 15 and a judging unit 16. The set operating mechanism 15 receives two [2] or more information sets 13 and performs a predetermined set operation. The judging unit 16 extracts the operation result indicating the relations between corresponding operations for a diagnosis and outputs output information 17 as a verification result in a predetermined format.

Figure 3:
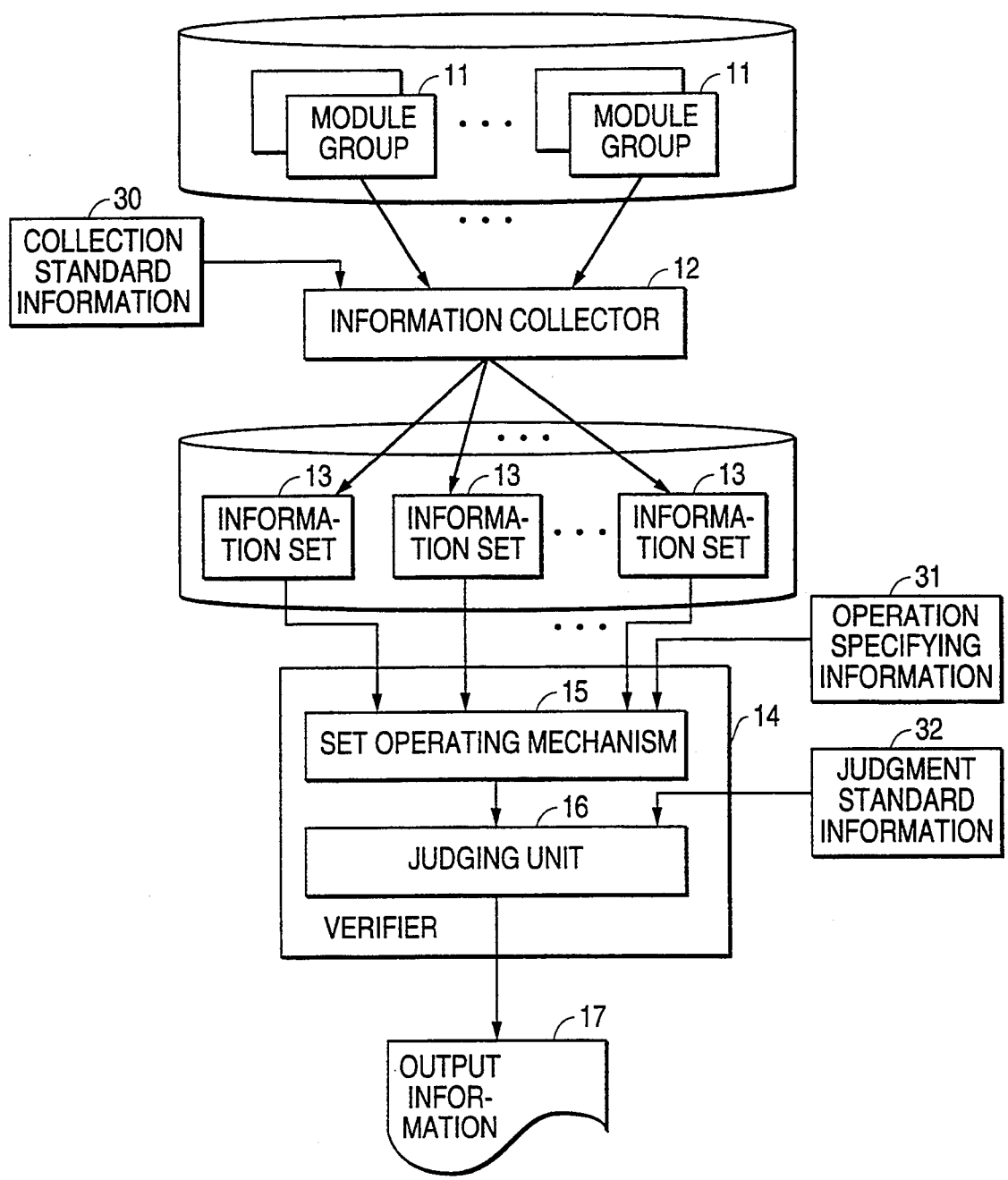
FIG. 3 is a block diagram showing a third configuration of this invention.

FIG. 3 is a block diagram showing a third configuration of this invention.

Elements shown in FIG. 3 which are the same as those shown in FIG. 1 or 2 have the same numbers.

In FIG. 3, 30 is collection standard information showing the standard of collecting information by the information collector 12, 31 is operation specifying information for specifying the kinds of operations performed by the set operating mechanism 15, and 32 is judgment standard information for showing the standard of a judgment performed by the judging unit 16.

Pursuant to the third form of this invention shown in FIG. 3, the information collector 12 receives from one [1] or more of the module groups 11 the collection standard information 30 for setting a standard for collecting information. The information collector 12 collects the identification data of the target information of an operation shown in the collection standard information 30, and creates an information set 13, whose elements comprise the identification data.

The verifier 14 comprises a set operating mechanism 15 and a judging unit 16. The set operating mechanism 15 receives the operation specifying information 31, which specifies a set operation standard, and two [2] or more information sets 13 and performs a set operation in accordance with the set operation standard. The judging unit 16 receives the judgment standard information 32 and the set operation result. Based on the judgment standard received as the judgment standard information 32, the judging unit 16 extracts, from within a module or in between module groups 11, the operation result indicating the relations between corresponding operations for a diagnosis and outputs output information 17 as a verification result in a predetermined format.

Figure 4:
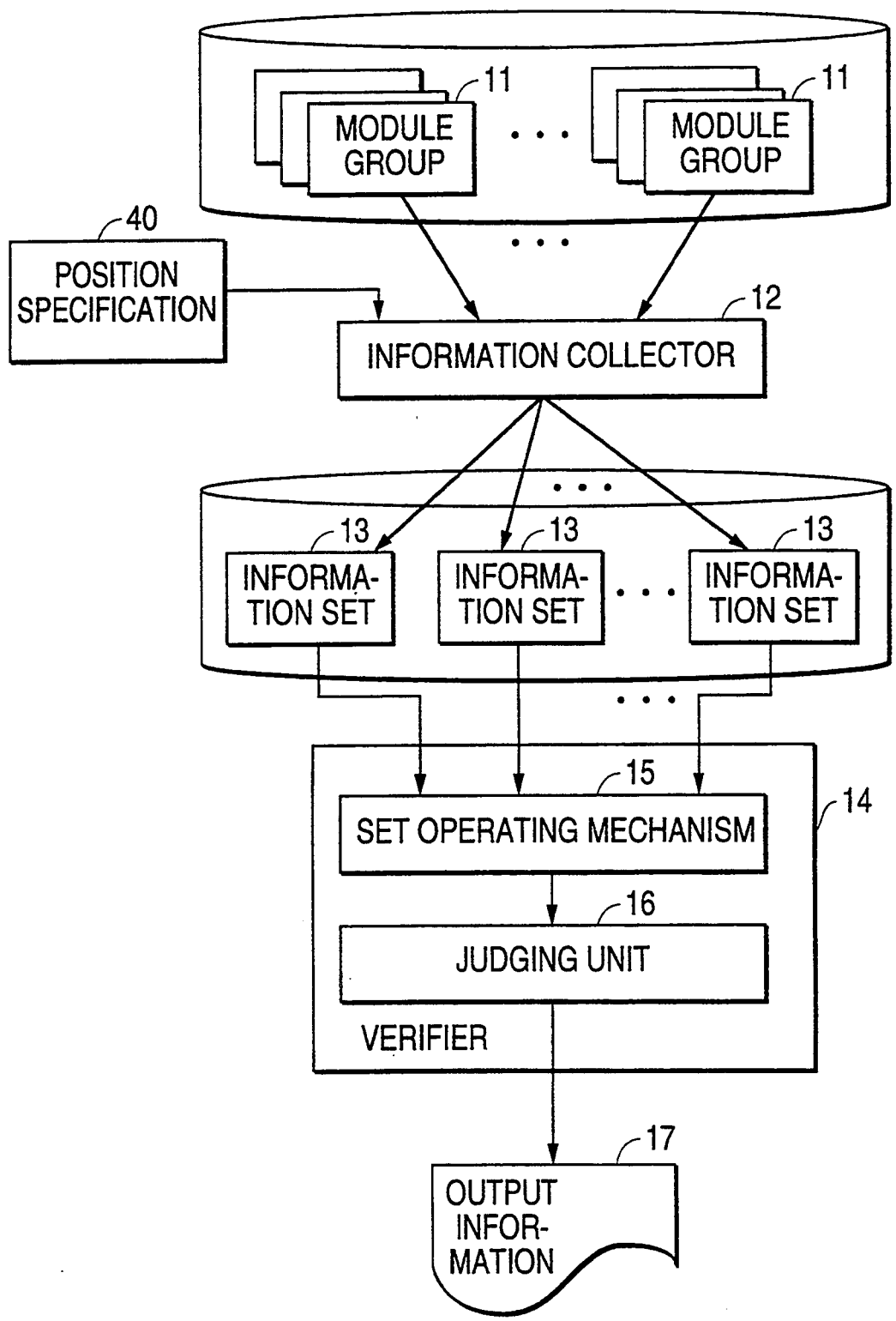
FIG. 4 is a block diagram showing a fourth configuration of this invention.

FIG. 4 is a block diagram showing a fourth configuration of this invention.

Elements shown in FIG. 4 which are the same as those shown in FIG. 1 or 2 have the same numbers.

In FIG. 4, 40 indicates a position specification for specifying the range of information collected by the information collector 12.

Pursuant to the fourth form of this invention shown in FIG. 4, the information collector 12 receives the position specification 40 for setting a range of collecting information. The information collector 12 collects, from one [1] or more modules (or module groups) 11, the desired identification data of the target information in the range specified by the position specification 40, and creates a plurality of information sets 13, whose elements comprise the identification data.

Figure 5:
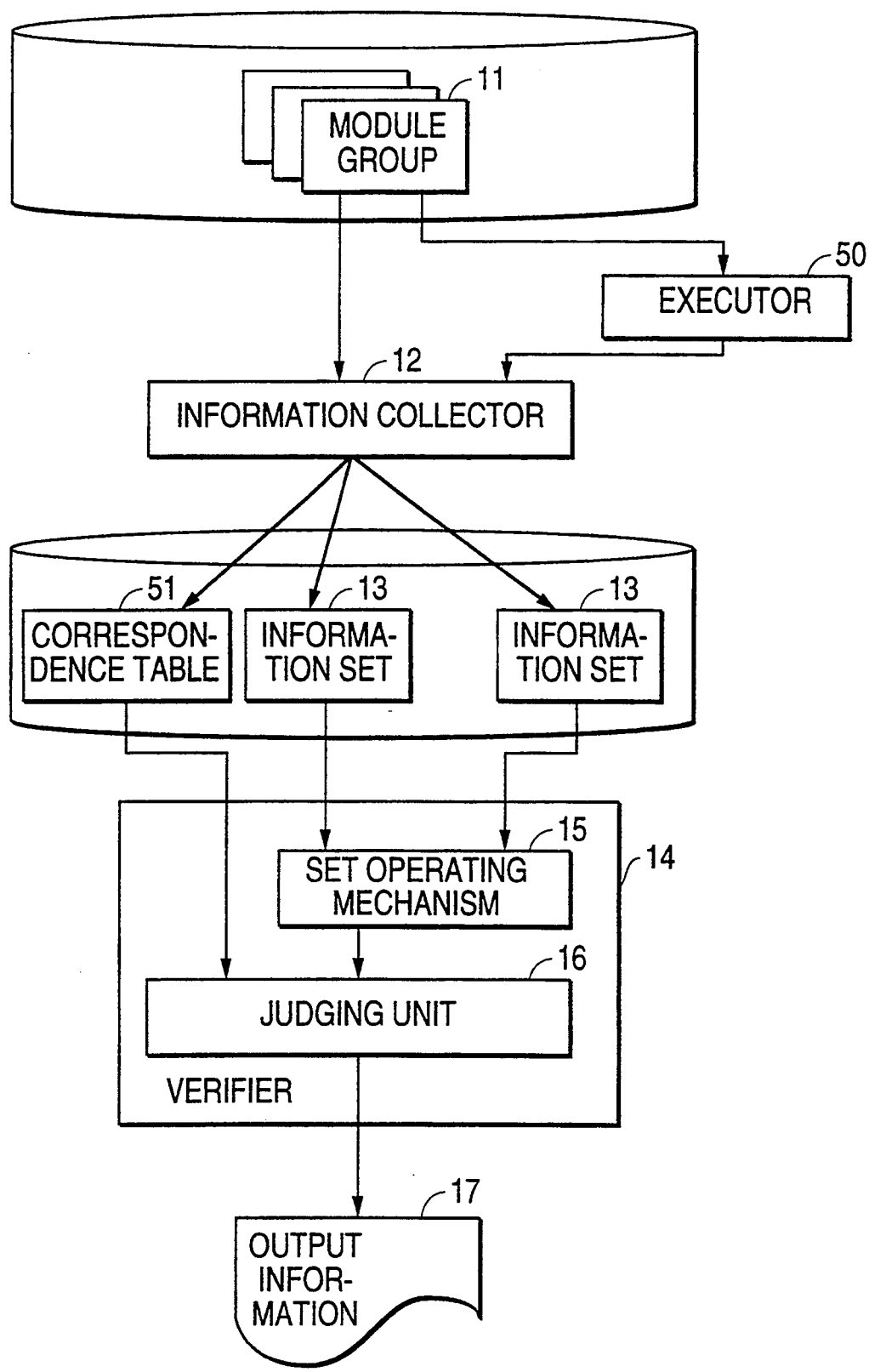
FIG. 5 is a block diagram showing a fifth configuration of this invention.

FIG. 5 is a block diagram showing a fifth configuration of this invention. FIGS. 6A through 6E show various relations between sets. Elements shown in FIG. 5 which are the same as those shown in FIGS. 1 or 2 have the same numbers.

In FIG. 5, 50 is an executor for executing the module groups 11 or for simulating its execution, 51 is a correspondence table for storing information of correspondence between an execution log, obtained as an output from the executor 50, and the identification data to be collected.

The fifth form of this invention shown in FIG. 5 newly comprises the executor 50. The executor 50 executes operations (including their simulations) within an inputted module (or any of the module groups 11), collects execution logs of the operations executed in a unit duration of execution, and supplies the execution logs to the information collector 12.

The information collector 12 establishes the correspondence between an execution log and identification data to be collected, adds the execution log to the identification data to be collected, and creates an information set 13 whose elements comprise the identification data.

The set operating mechanism 15 performs a set operation in accordance with the set operation standard. The judging unit 16 makes a judgment on the obtained result using the execution log, and outputs the output information 17 as a verification result showing a relation between operations by taking the history of executing respective elements into consideration.

This invention enables the conformance of the interfaces between modules or within a module to be verified in all applications by collecting identification data of the target information of an operation, by creating sets whose elements comprise the identification data, and by performing set operations among the sets.

Explanation of Actual Embodiments

FIGS. 7 through 11 show the system configurations of preferred embodiments of this invention.

Figure 12:
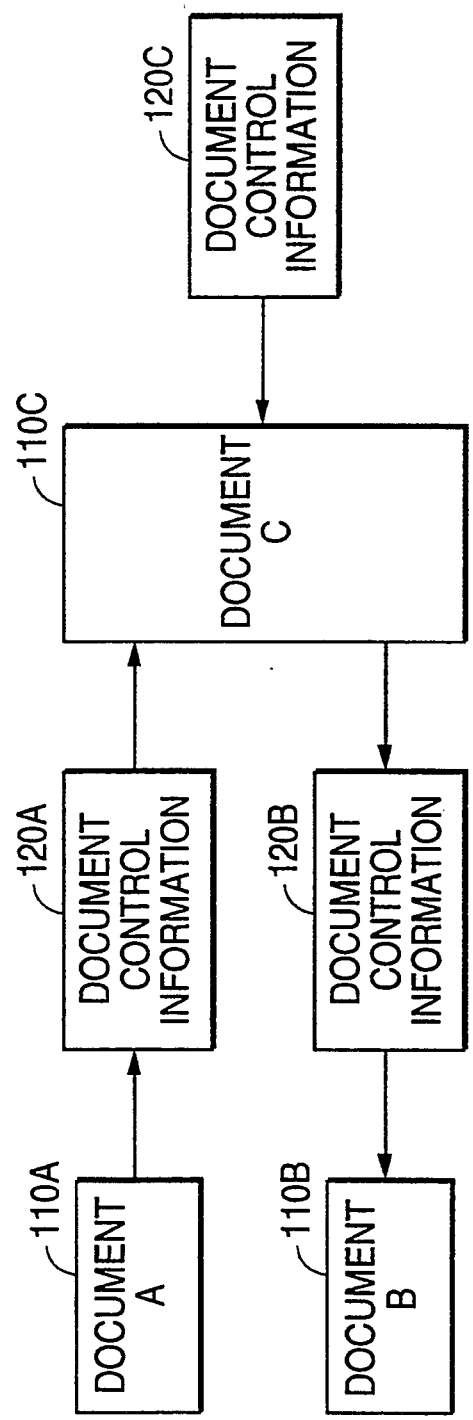
FIG. 12 is an explanatory chart for interface conformance verification during text editing pertinent to the preferred embodiments of this invention.

FIG. 12 is an explanatory chart for an interface conformance verification during a text editing pertinent to the preferred embodiments of this invention.

Figure 13:
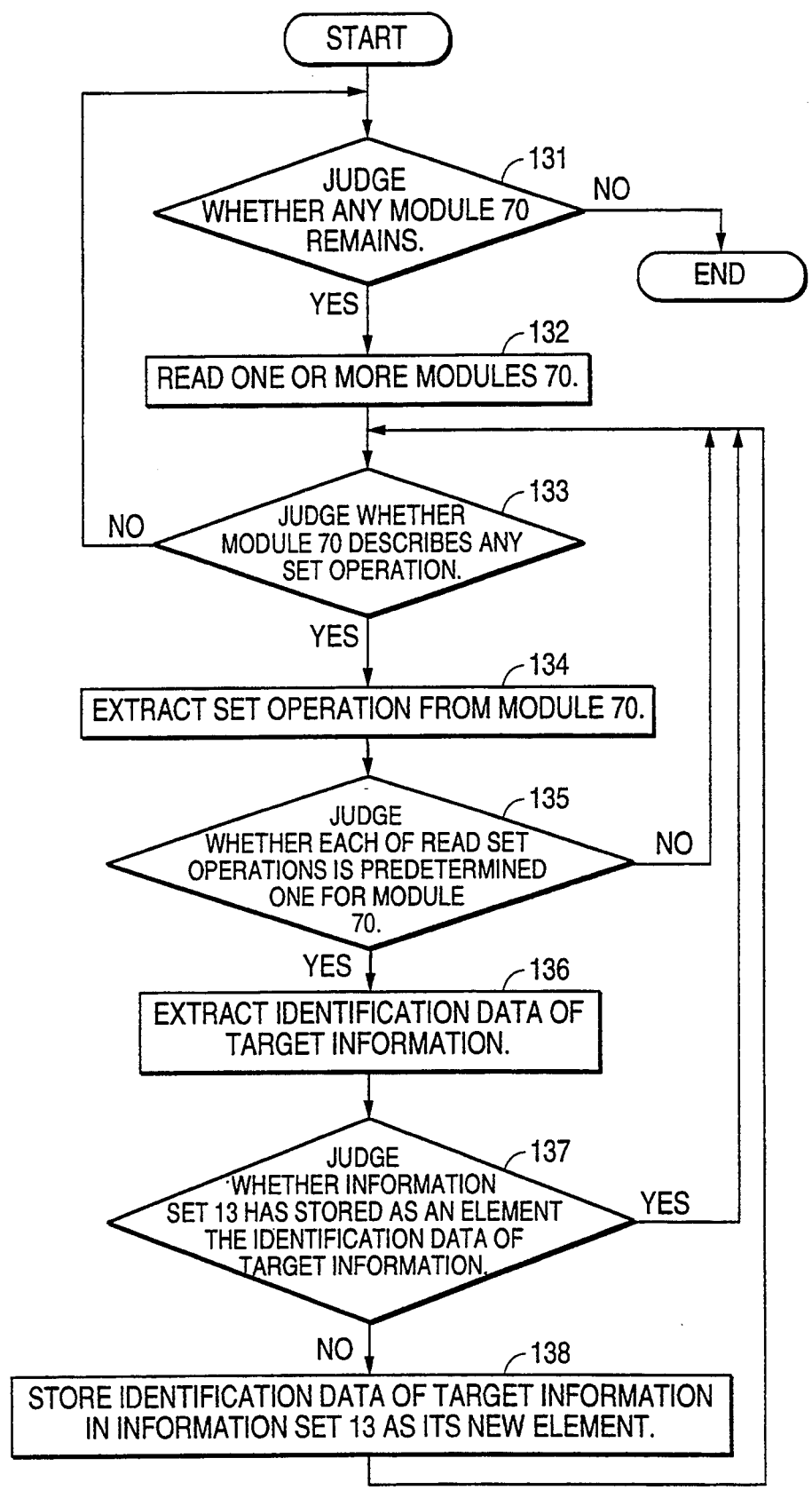
FIG. 13 is a flowchart showing the processes of an information collector pertinent to the preferred embodiments of this invention.

FIG. 13 is a flowchart showing the processes of an information collector pertinent to the preferred embodiments of this invention.

Figure 14A:
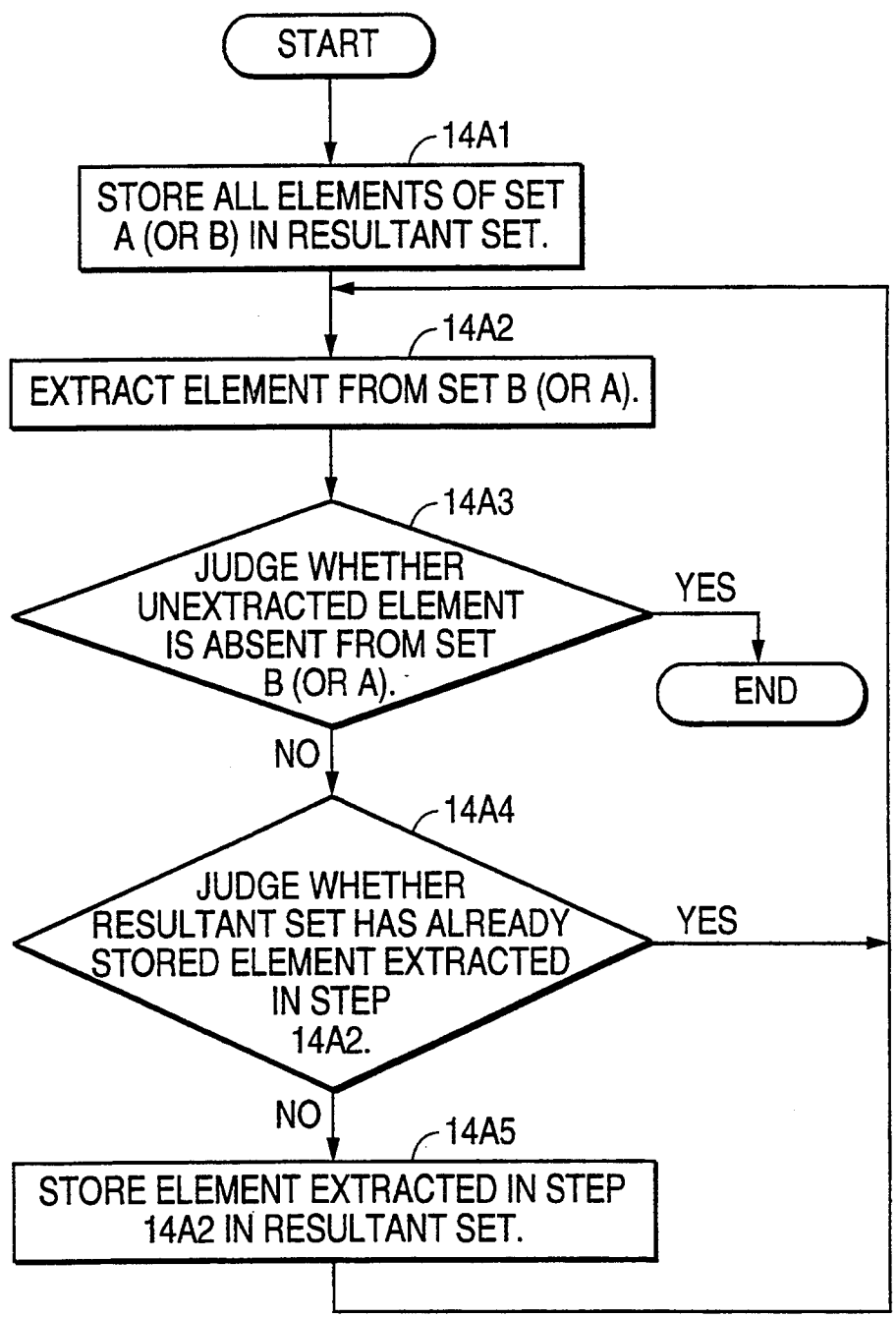
FIGS. 14A, 14B and 14C are flowcharts showing the processes for a set operation pertinent to the preferred embodiments of this invention.
Figure 14B:
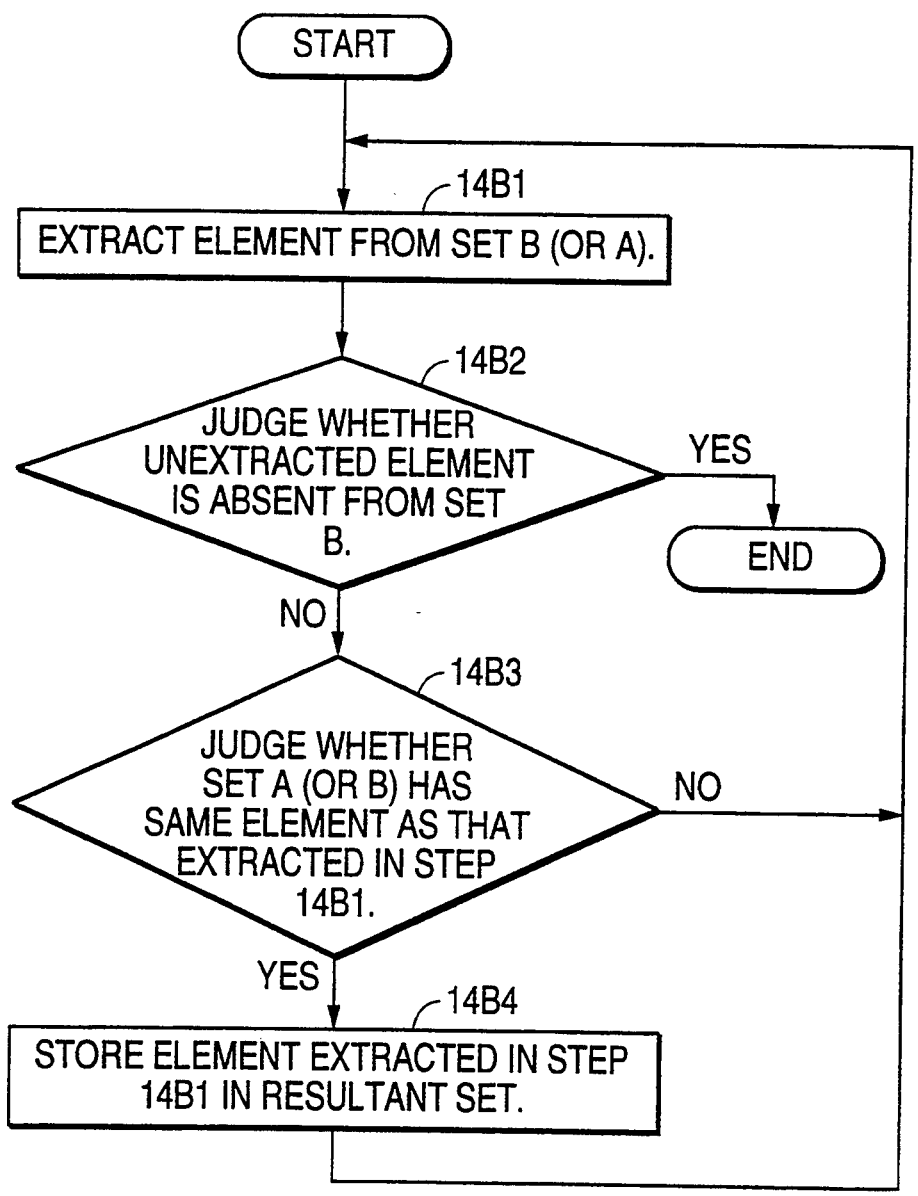
Figure 14C:
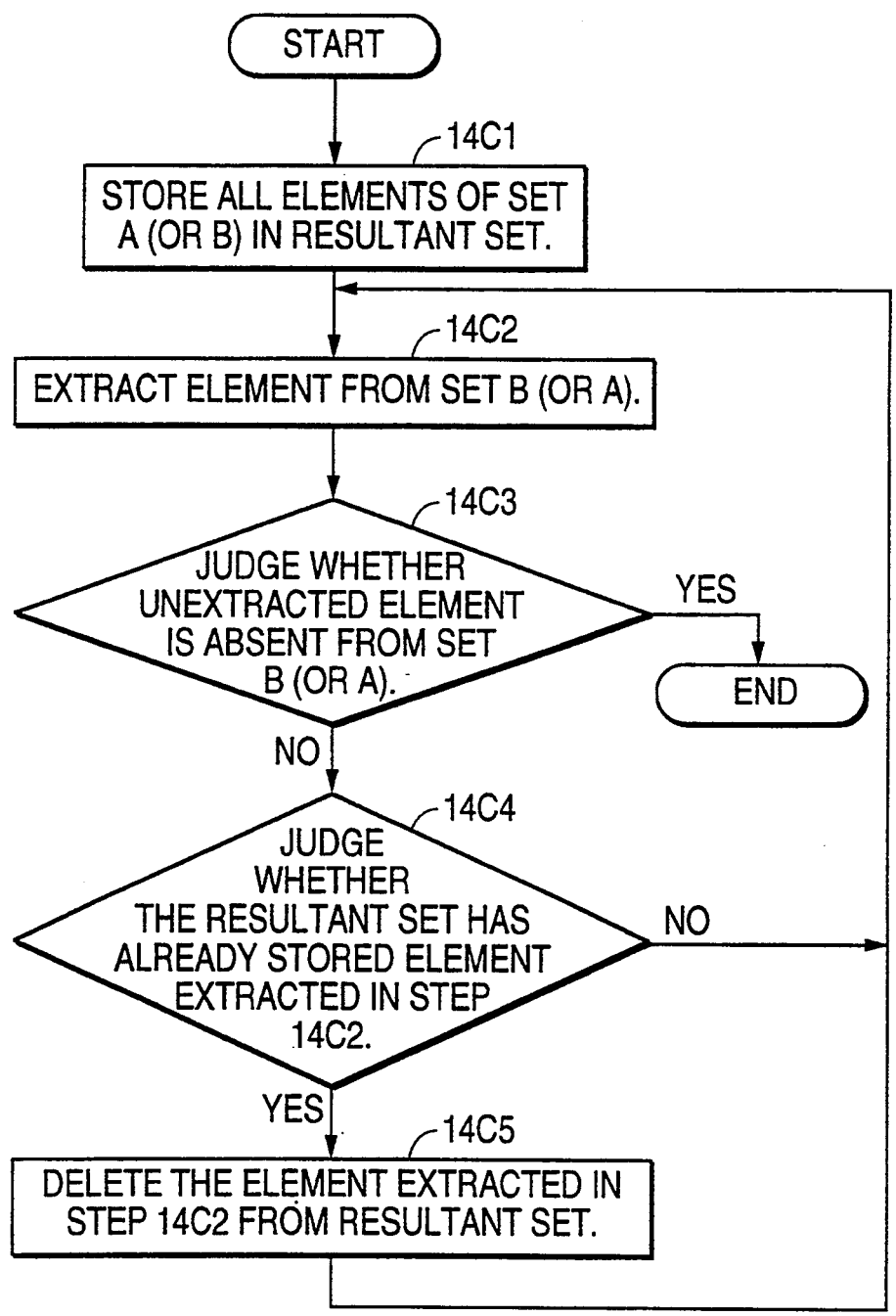

FIGS. 14A, 14B and 14C are flowcharts showing the processes for a set operation pertinent to the preferred embodiments of this invention.

Figure 7:
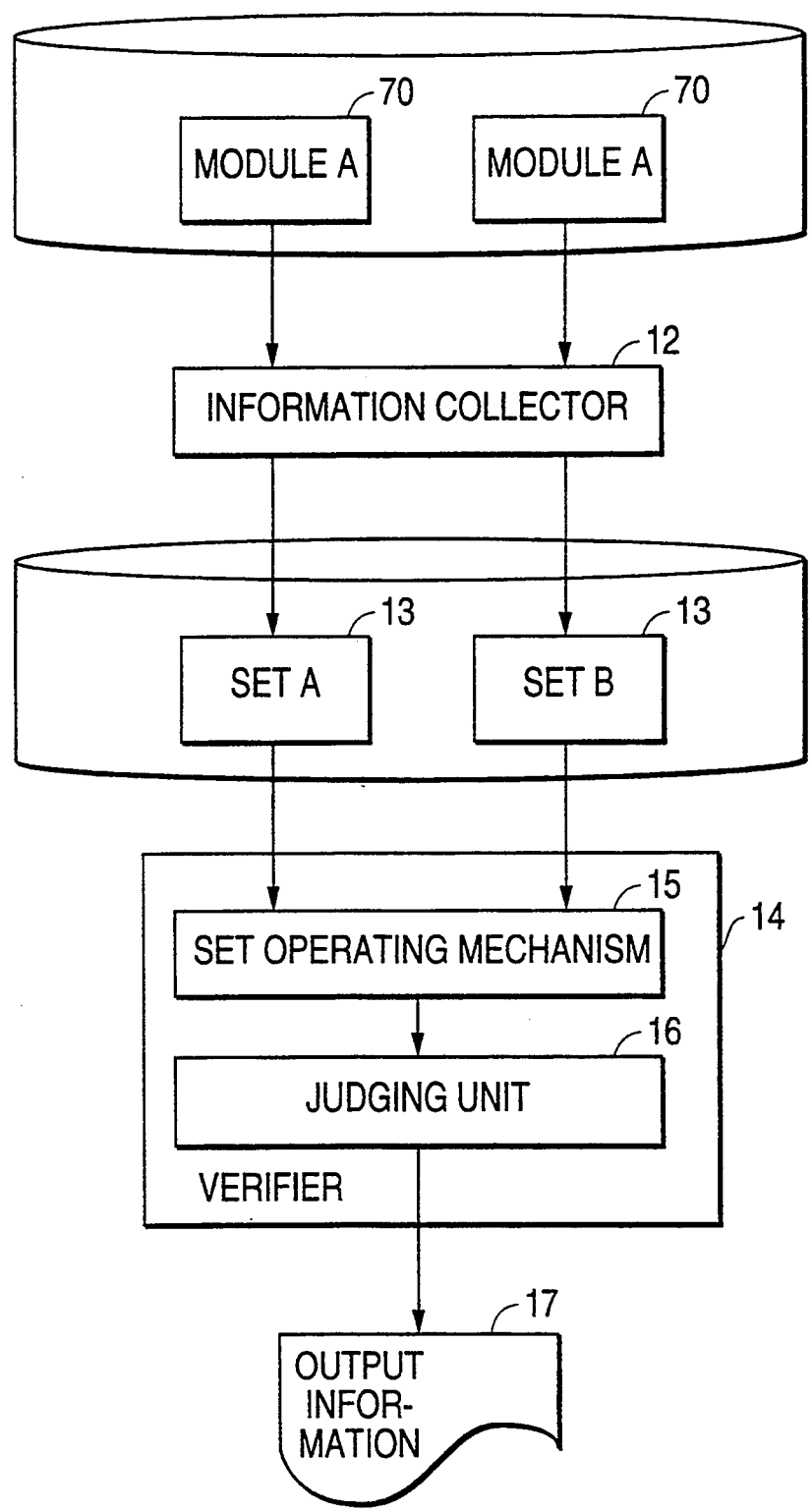
FIG. 7 is a more detailed block diagram of an inter-module interface conformance verification system based on the configuration shown in FIG. 1.

FIG. 7 shows a more detailed configuration of the inter-module interface conformance verification system shown in FIG. 1.

A Realization of the Information Collector 12

The information collector 12 is explained for an embodiment of this invention. The description in the flowchart shown as FIG. 13 is common to other embodiments.

As shown in FIG. 13, the information collector 12 performs the following processes for all modules 70 (or module groups), thereby creating respective information sets 13.

[START] After the information collector 12 starts its processing, it invokes step 131.

Step 131: The information collector 12 judges whether or not any of the modules 70 (or module groups) remains. If the information collector 12 judges affirmatively (YES), the process proceeds to step 132. If the information collector 12 judges negatively (NO), the process ends at [END].

Step 132: The information collector 12 reads one [1] or more given modules 70 (or module groups). Then, the process proceeds to step 133.

Step 133: The information collector 12 judges whether or not the module 70 (or module group) read in step 132 describes any set operation. If the information collector 12 judges affirmatively (YES), the process proceeds to step 134. If the information collector 12 judges negatively (NO), the process reverts to step 131.

Step 134: The information collector 12 extracts a set operation from the module 70 (or module group). Then, the process proceeds to step 135.

Step 135: The information collector 12 judges whether or not each of those read set operations is a predetermined set operation for the modules 70 (or module groups). If the information collector 12 judges affirmatively (YES), the process proceeds to step 136. If the information collector 12 judges negatively (NO), the process reverts to step 133.

Step 136: The information collector 12 extracts the identification data of the target information. Then, the process proceeds to step 137.

Step 137: The information collector 12 judges whether or not an information set 13 has stored as an element the identification data of the target information. If the information collector 12 judges affirmatively (YES), the process reverts to step 133. If the information collector 12 judges negatively (NO), the process proceeds to step 138.

Step 138: The information collector 12 stores the identification data of the target information in the information set 13 as a new element. Then, the process reverts to step 133.

That is, the information collector 12 stores the identification data of target information in an information set 13 as a new element, only when the information set 13 has not yet stored the same identification data; whereas the information collector 12 does not store the data in an information set 13 as a new element, when the information set 13 has already stored the same identification data.

The above processes comprising step 131 through step 138 are performed for all operations of one [1] or more given modules 70 (or module groups).

Internal Expression of the Information Set 13

An information set 13 does not store duplicated elements and its elements are not required. Therefore, a pool structural body having neither duplicate storage nor sequence is utilized as the information set 13.

The above pool structural body is assumed to be capable of supporting the following processes:

A judgment of whether or not an element "x" is stored therein.

A storage of an element "x" therein.

An extraction of an element stored therein.

A deletion of an element stored therein.

Realization of the Set Operating Mechanism 15

The set operating mechanism 15 realizes three [3] types of set operations, namely, operations for obtaining a sum set (A∪B), a product set (A∩B), and a difference set (A-B). The set operating mechanism 15 also performs composite set operations, by combining some of the above set operations, on three [3] or more inputs. The set operating mechanism 15 can realize the set operations by software or a conventional set operation apparatus.

FIG. 14A shows an algorithm for the set operating mechanism 15 to obtain a sum set "A∪B".

[START] After the process starts, step 14A1 is invoked.

Step 14A1: Store all elements of set A (or B) in a resultant set. Then, proceed to step 14A2.

Step 14A2: Extract an element from set B (or A), if any remain. Then, proceed to step 14A3.

Step 14A3: Judge whether or not an unextracted element was absent from set B (or A) in step 14A2. If the judgment is affirmative (YES), end the process at [END]. If the judgment is negative (NO), i.e., an element was extracted, proceed to step 14A4.

Step 14A4: Judge whether or not the resultant set has already stored the element extracted in step 14A2. If the judgment is affirmative (YES), revert to step 14A2 in a loop form. If the judgment is negative (NO), proceed to step 14A5.

Step 14A5: Store the element extracted in step 14A2 in the resultant set. Then, revert to step 14A2 in a loop form.

That is, after all elements of one [1] of the two [2] sets are stored in (a pool structural body which realizes) a resultant set: an element of the other one [1] of the two [2] sets is stored in the resultant set, if the resultant set has not yet stored the element; whereas it is not stored in the resultant set, if the resultant set has already stored the element. The set operating mechanism 15 repeats the above steps, until all the elements in the other one [1] of the two [2] sets are extracted.

FIG. 14B shows an algorithm for the set operating mechanism 15 to obtain a product set "A∩B".

[START] After the process starts, step 14B1 is invoked.

Step 14B1: Extract an element from set B (or A). Then, proceed to step 14B2.

Step 14B2: Judge whether or not an unextracted element was absent from set B in step 14B1. If the judgment is affirmative (YES), end the process at [END]. If the judgment is negative (NO), proceed to step 14B3.

Step 14B3: Judge whether or not set B (or A) has the same element as that extracted in step 14B1. If the judgment is affirmative (YES), proceed to step 14B4. If the judgment is negative (NO), revert to step 14B1 in a loop form.

Step 14B4: Store the element extracted in step 14B1 in the resultant set. Then, revert to step 14B1 in a loop form.

That is, if an element extracted from one [1] of the two [2] sets is stored in the other one [1] of the two [2] sets, the element is stored in (a pool structural body which realizes) a resultant set; otherwise it is not stored in the resultant set. The set operating mechanism 15 repeats the above steps, until all elements in the first of the two [2] sets are extracted.

FIG. 14C shows an algorithm for the set operating mechanism 15 to obtain a difference set "A-B".

[START] After the process starts, step 14C1 is invoked.

Step 14C1: Store all elements of set A (or B) in a resultant set. Then, proceed to step 14C2.

Step 14C2: Extract an element from set B (or A). Then, proceed to step 14C3.

Step 14C3: Judge whether or not an unextracted element was absent from set B (or A) in step 14C2. If the judgment is affirmative (YES), end the process at [END]. If the judgment is negative (NO), proceed to step 14C4.

Step 14C4: Judge whether or not the resultant set has already stored the element extracted in step 14C2. If the judgment is affirmative (YES), proceed to step 14C5. If the judgment is negative (NO), revert to step 14C2 in a loop form.

Step 14C5: Delete the element extracted in step 14C2 from the resultant set. Then, revert to step 14C2 in a loop form.

That is, after all elements of one [1] of the two [2] sets are stored in (a pool structural body which realizes) a resultant set: an element of the other one [1] of the two [2] sets is deleted from the resultant set, if the resultant set has already stored the element; whereas it is not deleted from the resultant set, if the resultant set has not stored the element. The set operating mechanism 15 repeats the above processes, until all the elements in the other one [1] of the two [2] sets are extracted.

Realization of Judging Unit 16

The judging unit 16 performs the following to the sets obtained by the set operating mechanism 15.

(1) Judge whether or not a set is a void set (having no elements).

(2) Unless the set is a void set, extract all elements from the set.

(3) Attach the semantics corresponding to a performed set operation.

(4) Output a judgment, a performed set operation, an element, and so forth.

Figure 15:
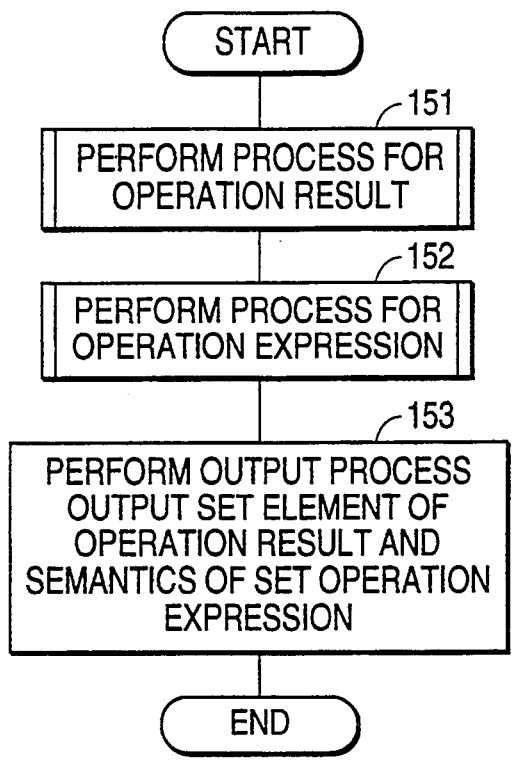
FIG. 15 is a flowchart of processes performed by the judging unit 16 for an inter-module interface verification system configured as shown in FIG. 1.

FIG. 15 is a flowchart of processes performed by the judging unit 16 for an inter-module interface verification system configured as shown in FIG. 1.

[START] After the judging unit 16 starts its judging processes, it invokes step 151.

Step 151: The judging unit 16 performs its processes for an operation result. (Refer to FIG. 16 for further detail of the processes performed in this step.) Then, the judging unit 16 proceeds to perform step 152.

Step 152: The judging unit 16 performs its processes for an operation expression. (Refer to FIG. 17 for further detail of the processes performed in this step.) Then, the judging unit 16 proceeds to perform step 153.

Step 153: The judging unit 16 performs its output process by outputting a set element of an operation result and the semantics of a set operation expression. Then, the judging unit 16 ends its processes at [END].

Figure 16:
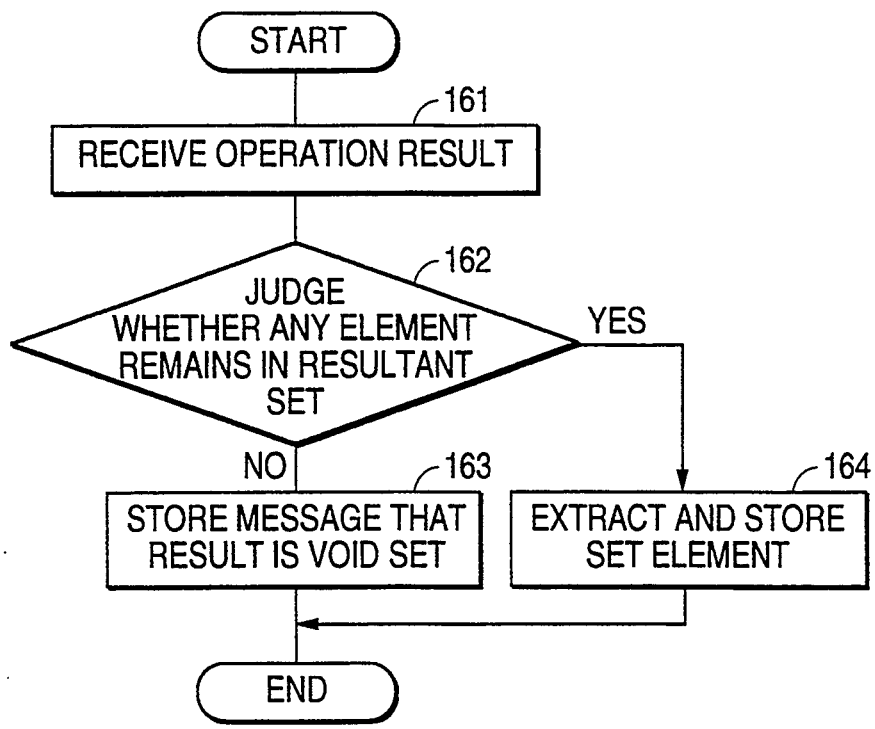
FIG. 16 is a flowchart of processes performed by the judging unit 16 for an operation result.

FIG. 16 is a flowchart of processes performed by the judging unit 16 for an operation result.

Figure 20:
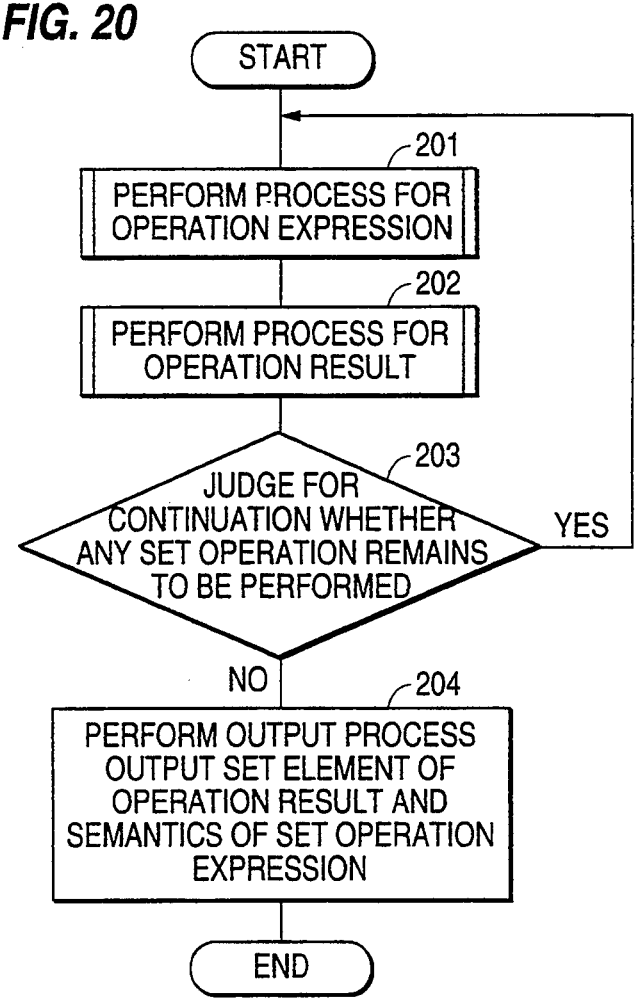
FIG. 20 is a flowchart of processes performed by a judging unit in the intra-module interface verification system shown in FIG. 2.
Figure 21:
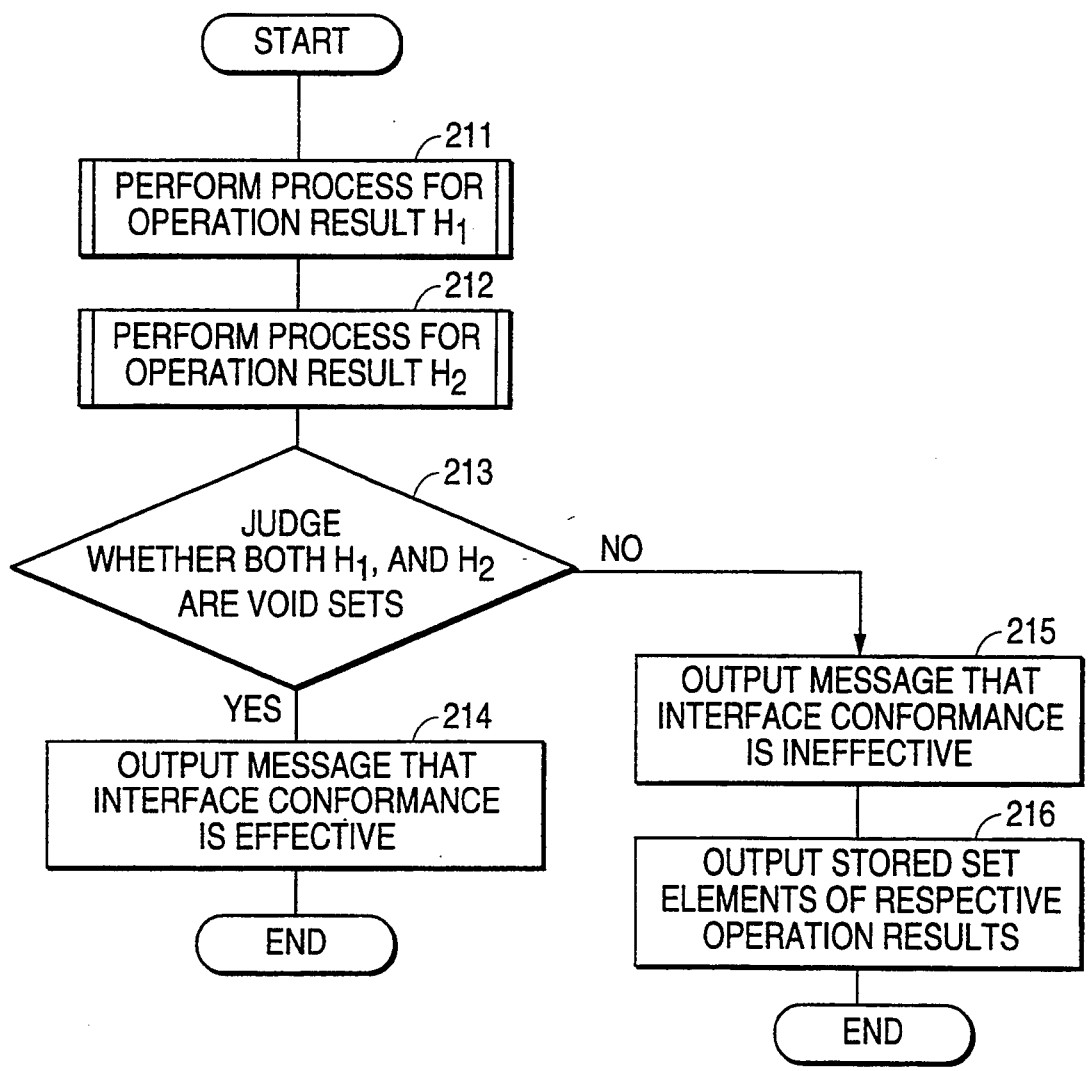
FIG. 21 is a flowchart of processes performed by the judging unit for an inter-module interface verification system as shown in FIG. 1 and for an intra-module interface verification system as shown in FIG. 2.
Figure 22:
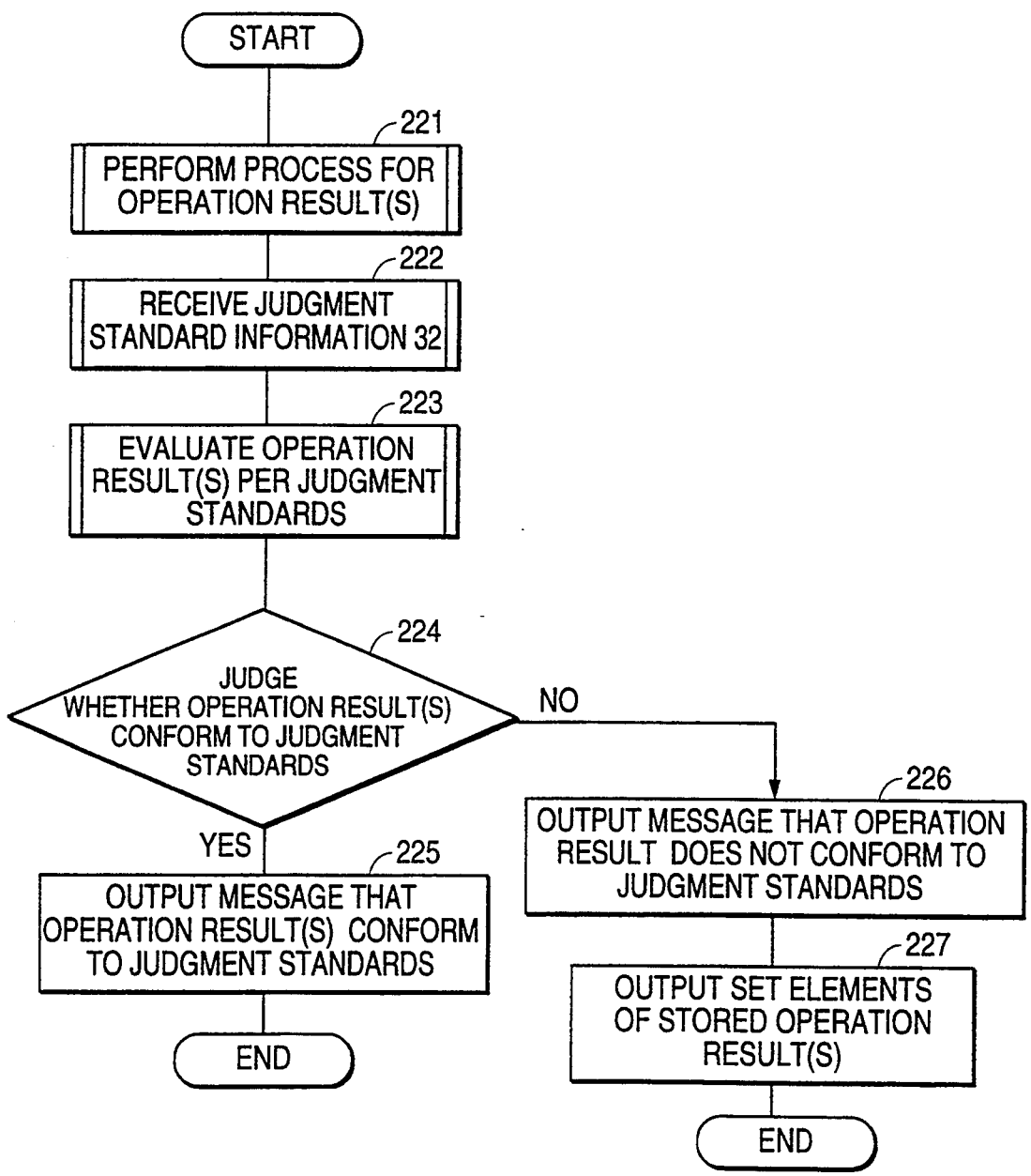
FIG. 22 is a flowchart of processes performed by the judging unit for an inter-module interface verification system as shown in FIG. 3 and for an intra-module interface verification system as shown in FIG. 3.
Figure 23:
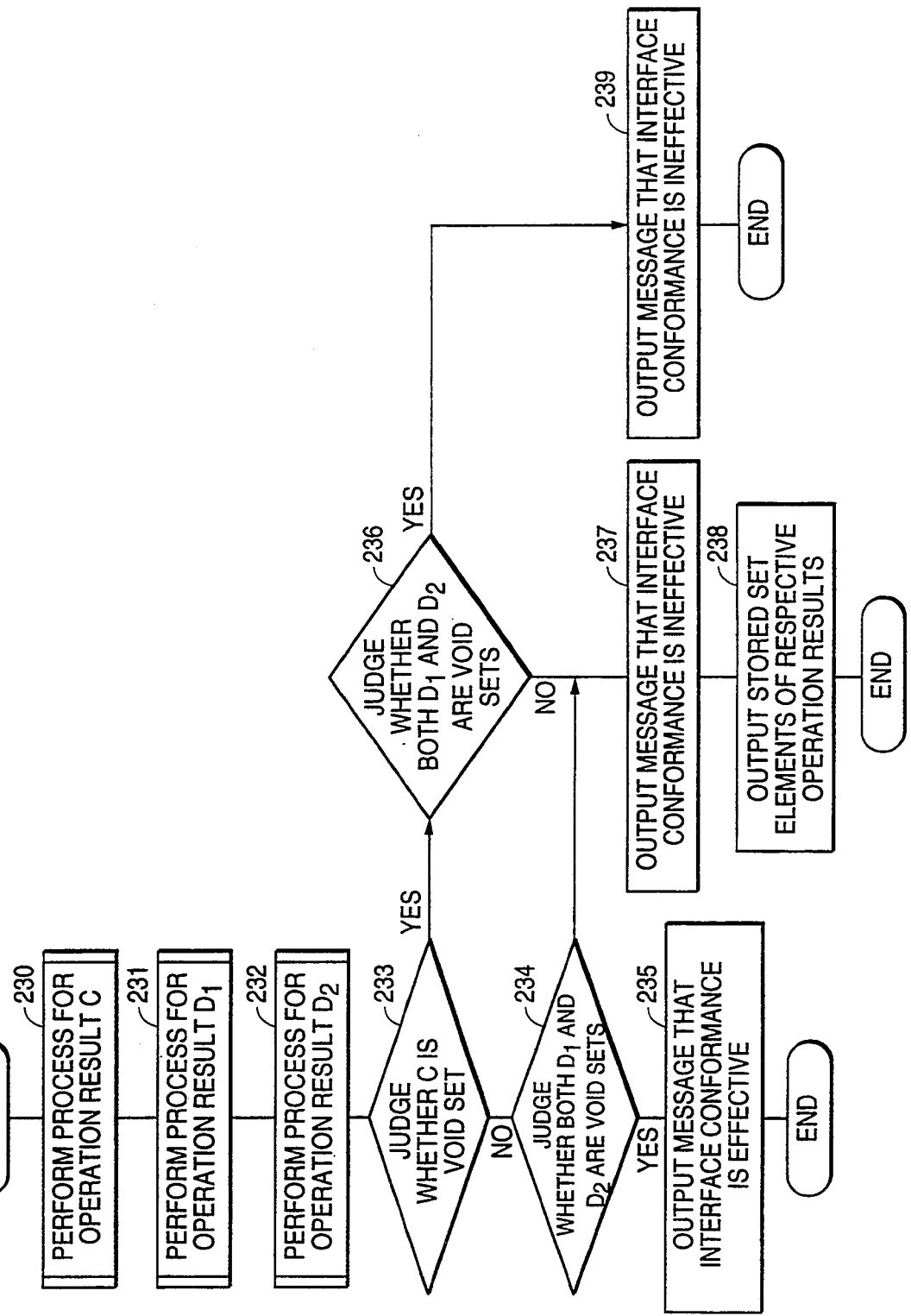
FIG. 23 is a flowchart of processes performed by the judging unit in the intra-module document control information interface verification system shown in FIG. 4.
Figure 26:
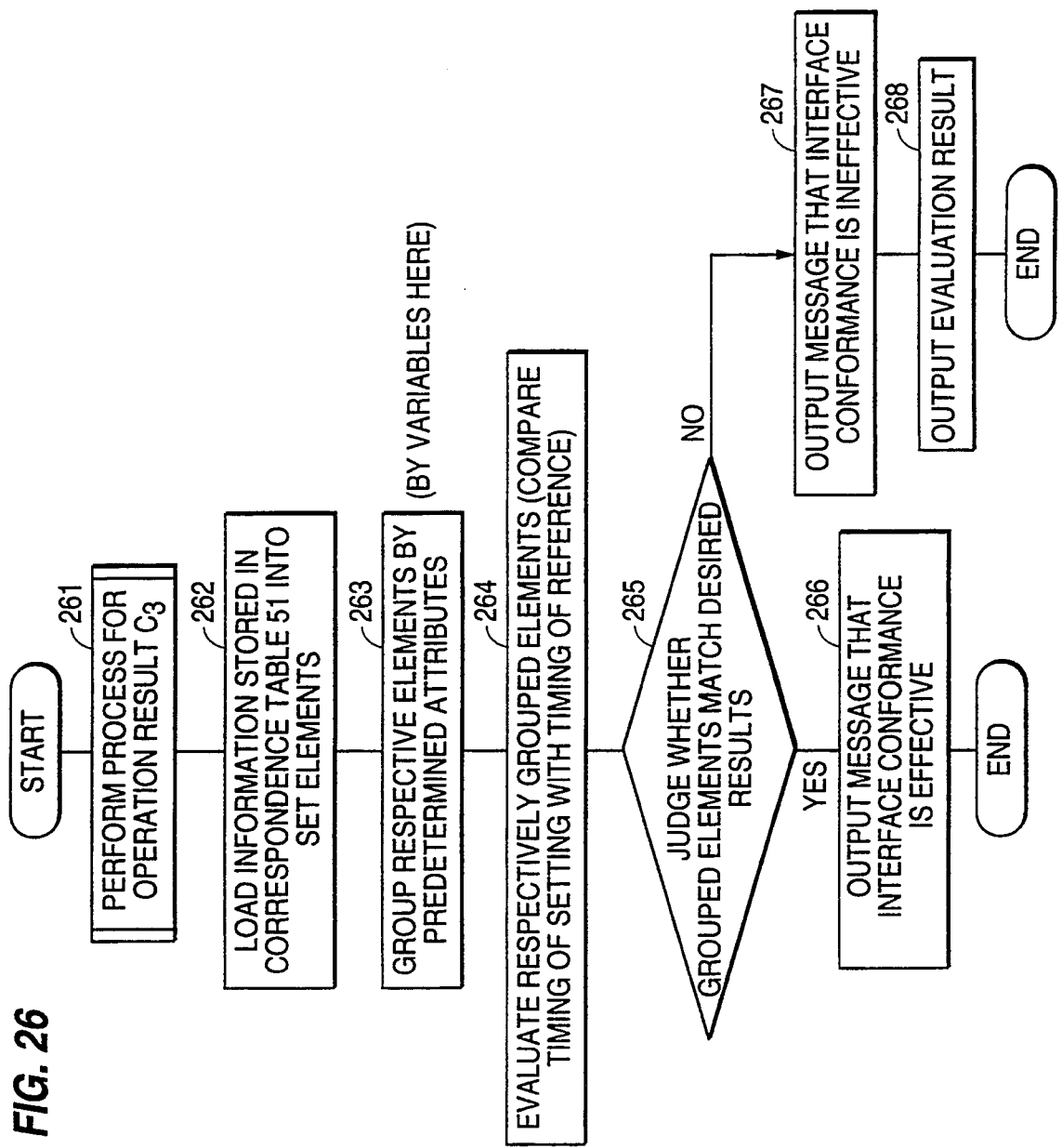
FIG. 26 is a flowchart of processes performed by the judging unit for both an inter-module interface verification system and an intra-module interface verification system as shown in FIG. 5.

More specifically, FIG. 16 describes in detail the processes performed in step 151 shown in FIG. 15, in step 202 shown in FIG. 20, in steps 211 and 212 shown in FIG. 21, in step 221 shown in FIG. 22, in steps 230, 231 and 232 shown in FIG. 23, and in step 261 shown in FIG. 26.

[START] After the judging unit 16 starts its processes for an operation result, it invokes step 161.

Step 161: The judging unit 16 receives an operation result.

Then, the judging unit 16 proceeds to perform step 162.

Step 162: The judging unit 16 judges whether or not any element remains in the resultant set. If the judgment is negative (NO), the judging unit 16 proceeds to perform step 163. If the judgment is affirmative (YES), the judging unit 16 skips to perform step 164.

Step 163: The judging unit 16 stores a message that the result is a void set. Then, the judging unit 16 ends its processes at [END].

Step 164: The judging unit 16 extracts and stores the set element. Then, the judging unit 16 ends its processes at [END].

Figure 17:
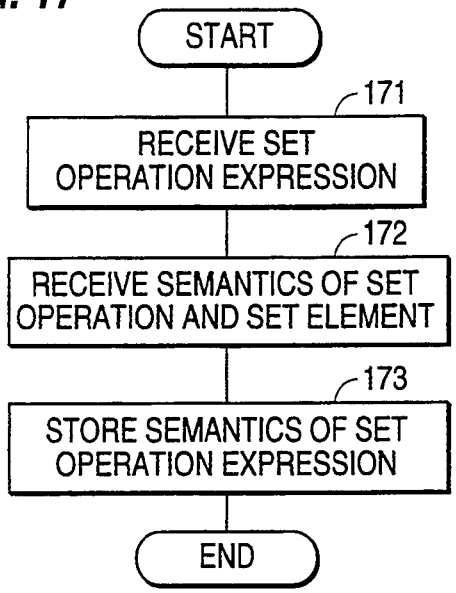
FIG. 17 is a flowchart of processes performed by the judging unit 16 for an operation expression.

FIG. 17 is a flowchart of processes performed by the judging unit 16 for an operation expression.

More specifically, FIG. 17 describes in detail the processes performed in step 152 shown in FIG. 15 and step 201 shown in FIG. 20.

[START] After the judging unit 16 starts its processes for an operation result, it invokes step 171.

Step 171: The judging unit 16 receives a set operation expression. Then, the judging unit 16 proceeds to perform step 172.

Step 172: The judging unit 16 receives the semantics of a set operation and a set element of the set operation expression. Then, the judging unit 16 proceeds to perform step 173.

Step 173: The judging unit 16 stores the semantics of the set operation expression. Then, the judging unit 16 ends its processes at [END].

A Realization of the Verifier 14 for Verifying an Inter-module Interface

The following is a description of a system, having the above internal configuration, for verifying an interface between modules.

The information collector 12 shown in FIG. 7 collects the following information:

the names of the variables set inside of a module (Module A), thereby creating an information set (Set A) whose elements comprise the names of the variables collected from Module A; and the names of the variables set inside of another module (Module B), thereby creating another information set (Set B) whose elements comprise the names of the variables collected from Module B.

Suppose here as an example that a module has an internal expression "a=b", where a value is set to a variable "a" and a value is referenced from a variable "b". Further, assume a case where a comparison operation "a==b" is performed and a function "func(a,b,c)" is called up, in which respective values of variables "a", "b" and "c" are referenced.

The set operating mechanism 15 in the verifier 14 performs a set operation to obtain a product set A∩B. The elements obtained as a result of the set operation can be considered as variables for controlling the data flowing from Module A to Module B. Thus, the judging unit 16 outputs the result of the set operation.

Assume here, for instance, that Module A and Module B are described by the following statements.

```
Module A () {
        P = pct + STORAGE(*pct);
        CP = pct + 1;
        DET = 1;
        L++;
}
Module B () {
        point = ST;
        point−>var_size = STORAGE(*pct);
        point−>ret_env = E;
        putvalue(point−> ret_code, DET, CP);
        point−>b_frame = B;
        point−>label = L;
        E = point;
        Y = ST + E_FRAME_SIZE;
        ST = Y + STORAGE(*pct);
        P++;
}
        Then, the information collector 12 obtains
        A = {P, CP, DET, L} and
        B = {ST, pct, E, point, DET, CP, B, L,
E_FRAME_SIZE, Y},
``` whereas the set operating mechanism 15 obtains A∩B={CP, DET, L}.

The judging unit 16 outputs this result and issues a notice to a user of this system.

Another Example (1)

In the above example, it is possible to assume that a module (Module A) is a module group comprising a plurality of modules and that another module (Module B) is another module group comprising a plurality of modules excluding those included in the former (Module A).

Figure 8:
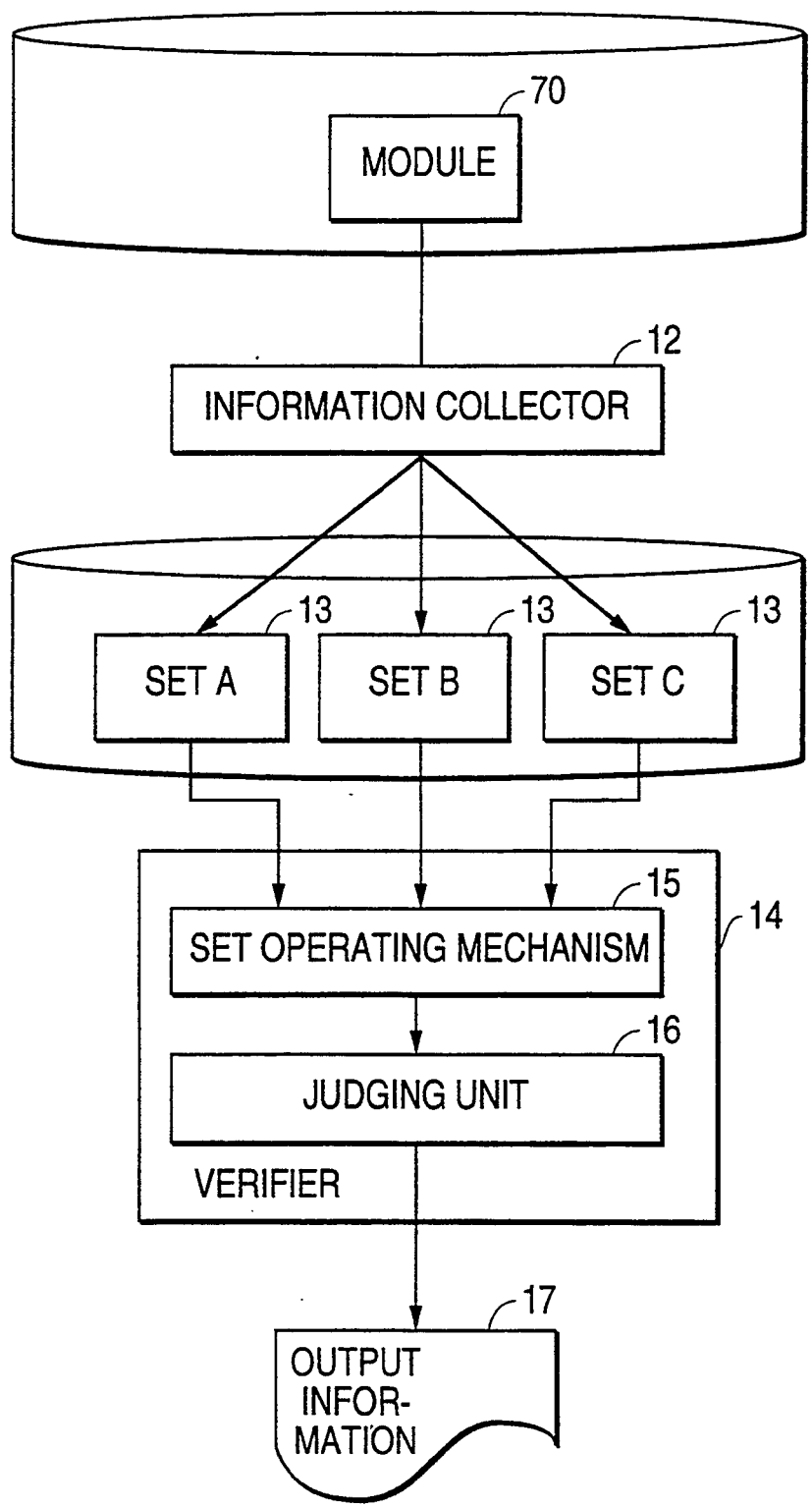
FIG. 8 is a more detailed block diagram of an intra-module interface conformance verification system based on the configuration shown in FIG. 2.

FIG. 8 shows a more detailed configuration of an intra-module interface conformance verification system shown in FIG. 2.

Realization of the Verifier 14 for Verifying an Intra-module Interface

The information collector 12 shown in FIG. 8 collects the following information:

the names of the variables defined (declared) within a module 70, thereby creating Set A whose elements comprise these names of the variables;

the names of the variables referenced within a module 70, thereby creating Set B whose elements comprise these names of the variables; and the names of the variables having values set within a module 70, thereby creating Set C whose elements comprise these names of the variables.

The set operating mechanism 15 in the verifier 14 performs set operation(s) for the three [3] sets, i.e. Set A, Set B and Set C, whose elements comprise the names of the variables collected by the information collector 12, as shown in FIG. 6E.

FIGS. 18A through 18D illustrate relations among three [3] sets used for explaining the preferred embodiments of this invention.

The judging unit 16 in the verifier 14 makes the following judgments:

(1) Elements of "(BUC)-A", namely the slashed part shown in FIG. 18A, are variables utilizing (value referencing and value setting) what are defined (assigned) outside of a module.

(2) Elements of "A-(BUC)", namely the slashed part shown in FIG. 18B, are variables utilized (value referenced and value set) or what are not yet utilized outside of the module.

(3) Elements of "(B-C)", namely the slashed part shown in FIG. 18C, are variables whose values are set outside of a module (and referenced inside of the module).

(4) Elements of "C-B", namely the slashed part shown in FIG. 18D, are variables (whose internally set values are) referenced outside of the module.

The judging unit 16 outputs those judgment results and their elements.

FIG. 19 illustrates an exemplary result obtained by executing set operations in the preferred embodiments of this invention.

The following describes a processing example.

```
module Module A{
        FILE *fd;
        char my_buffer [BUFSIZ];
        char *file_name = "test.dat";
        fd = fopen(file_name,"r");
        . . . .
        printf("%s", my_buffer);
        . . . .
}
```

FIG. 20 is a flowchart of processes performed by a judging unit for an intra-module interface verification system as shown in FIG. 2.

[START] After the judging unit 16 starts its judging processes, it invokes step 201.

Step 201: The judging unit 16 performs its processes for an operation expression. (Refer to FIG. 17 for further detail of the processes performed in this step.) Then, the judging unit 16 proceeds to perform step 202.

Step 202: The judging unit 16 performs its processes for an operation result. (Refer to FIG. 16 for further detail of the processes performed in this step.) Then, the judging unit 16 proceeds to perform step 203.

Step 203: The judging unit 16 judges whether or not any set operation remains to be performed, thereby continuing the processes for respective set operations in steps 201 and 202 until there are no more set operations yet to be performed. If the judgment is negative (NO), the judging unit 16 proceeds to perform step 204. If the judgment is affirmative (YES), the judging unit 16 reverts to perform step 201 in a loop form.

Step 204: The judging unit 16 performs its output process by outputting a set element of an operation result and the semantics of a set operation expression. Then, the judging unit 16 ends its processes at [END].

At this time, the information collector 12 collects information from Module A, thereby creating the following sets.

Internal Definition: Set A={fd, my_buffer, file_name}
Value Reference: Set B={BUFSIZ, file_name, my_buffer}
Value Setting: Set C={file_name, fd}

At this time, the information collector 12 obtains the following results.

(BUC)-A ={BUFSIZ}
A-(BUC)=0
B-C={BUFSIZ, my_buffer}
C-B={fd}

Then, the information collector 12 produces an output as shown in FIG. 19 where $\Phi$ is an empty set.

Figure 9:
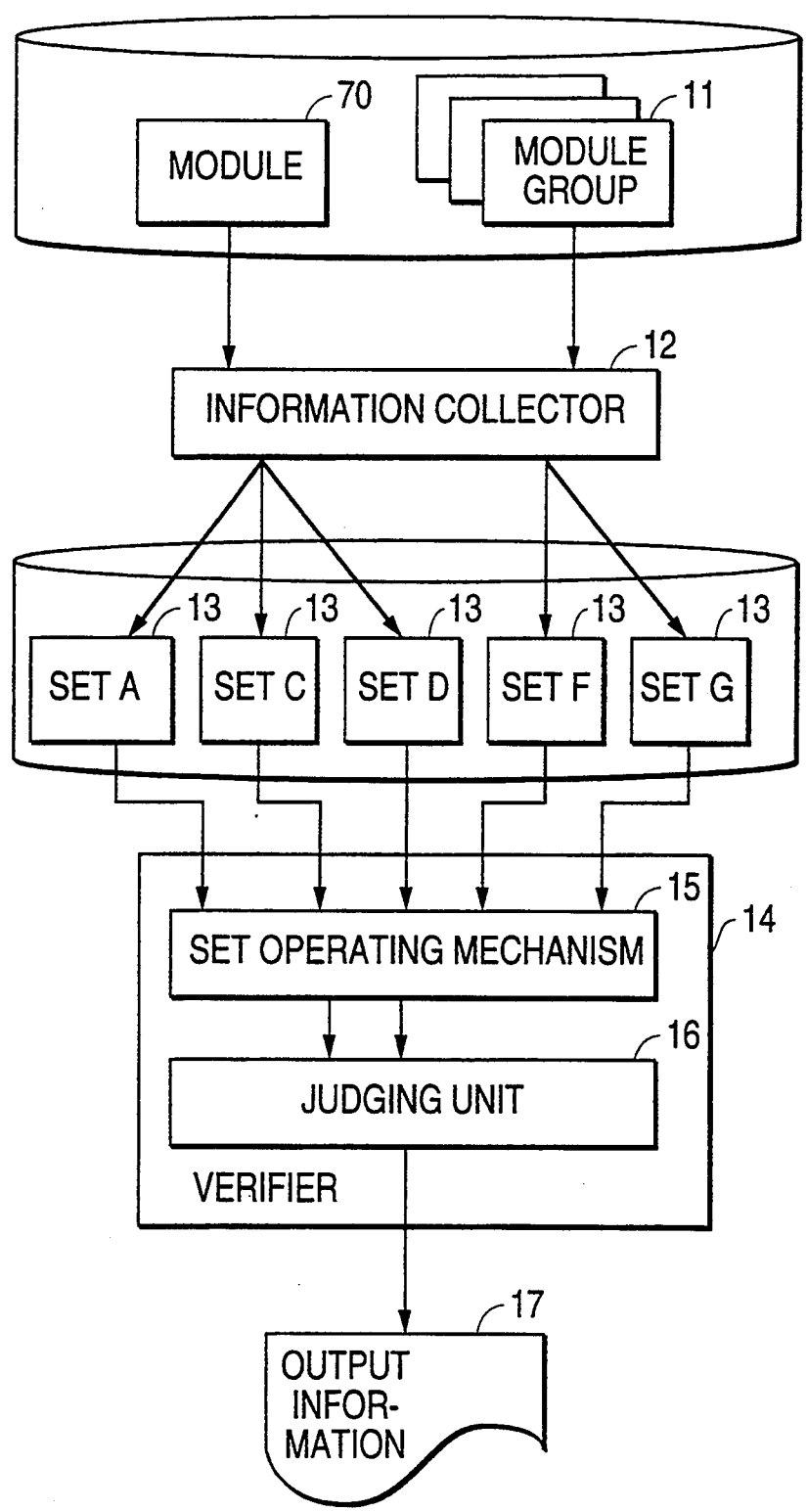
FIG. 9 is a block diagram of both the inter-module interface verification system shown in FIG. 1 of this invention and the intra-module interface verification system shown in FIG. 2.

FIG. 9 shows the configuration both of an inter-module interface verification system as shown in FIG. 1 of this invention and of an intra-module interface verification system as shown in FIG. 2;

The following is a description of a system for verifying both an intra-module interface as shown in FIG. 2 and an inter-module interface, which takes advantage of this invention as shown in FIG. 1. More specifically, it is a verification system for verifying the validities of instructions for a module explicitly specifying the input thereto and output therefrom in relation to external modules.

The information collector 12 shown in FIG. 12 collects the following information:

the names of variables defined (declared) inside of the module 70, thereby creating Set A whose elements comprise these names of variables;

the names of variables set inside of the module 70, thereby creating Set C whose elements comprise these names of variables;

the names of variables clearly described inside of the module 70 and outputted to the outside, thereby creating Set D whose elements comprise these names of variables;

the names of all variables referenced by modules other than module 70, thereby creating Set F whose elements comprise these names of variables; and the names of all variables set by modules other than module 70, thereby creating Set G whose elements comprise these names of variables.

The set operating mechanism 15 in the verifier 14 first performs the following set operations.

$H_1$=(AUC)∩(FUG)-D
$H_2$=D-(AUC)∩(FUG)

The judging unit 16 checks whether or not the set operation results $H_1$ and $H_2$ satisfy $H_1=H_2=0$.

If the check result confirms the satisfaction of this relation, the judging unit 16 outputs a message that the intra-module interface conformance is effective, as the explicitly described output indication to the outside of the module. If the check result does not confirm the satisfaction of this relation, the judging unit 16 outputs a message that the intra-module interface conformance is ineffective, as the explicitly described output indication to the outside of the module, together with results of the above set operations, as necessary.

FIG. 21 is a flowchart of processes performed by the judging unit for the system illustrated in FIG. 9 including both as an inter-module interface verification system shown in FIG. 1 and an intra-module interface verification system shown in FIG. 2.

[START] After the judging unit 16 starts its judging processes, it invokes step 211.

Step 211: The judging unit 16 performs its processes for an operation result $H_1$. (Refer to FIG. 16 for further detail of the processes performed in this step.) Then, the judging unit 16 proceeds to perform step 212.

Step 212: The judging unit 16 performs its processes for an operation result $H_2$. (Refer to FIG. 16 for further detail of the processes performed in this step.) Then, the judging unit 16 proceeds to perform step 213.

Step 213: The judging unit 16 judges whether or not operation results $H_1$ and $H_2$ are both void sets. If the judgment is affirmative (YES), the judging unit 16 proceeds to perform step 214. If the judgment is negative (NO), the judging unit 16 skips to perform step 215.

Step 214: The judging unit 16 outputs a message that an interface conformance is effective. Then, the judging unit 16 ends its processes at [END].

Step 215: The judging unit 16 outputs a message that an interface conformance is ineffective. Then, the judging unit 16 proceeds to perform step 216.

Step 216: The judging unit 16 outputs the stored set elements of respective operation results. Then, the judging unit 16 ends its processes at [END].

FIG. 9 is explained below in further detail. The information collector 12 collects the following information in a similar manner:

the names of variables defined (declared) inside of the module 70, thereby creating Set A whose elements comprise these names of variables;

the names of variables referenced inside of the module 70, thereby creating Set B whose elements comprise these names of variables;

the names of variables set inside of the module 70, thereby creating Set C whose elements comprise these names of variables;

the names of variables clearly described inside of the module 70 and inputted from the outside, thereby creating Set E whose elements comprise these names of variables; and the names of variables set by all modules other than the module 70, thereby creating Set G whose elements comprise these names of variables.

The set operating mechanism 15 in the verifier 14 first performs the following set operations.

$H_1$=(((BUC)∩G)-A)-E
$H_2$=E-(((BUC)∩G)-A)

The judging unit 16 checks whether or not the set operation results $H_1$ and $H_2$ satisfy $H_1=H_2=0$.

If the check result confirms the satisfaction of this relation, the judging unit 16 outputs the information that the explicitly described input indication to the inside of module 70 conforms to the intra-module processing. If the check result does not confirm the satisfaction of this relation, the judging unit 16 outputs a message that the explicitly described input indication to the inside of module 70 does not conform to the intra-module processing and results of the above set operations, as necessary.

These procedures enable the validities of the explicitly stated descriptions about the input to and output from a module with other modules to be verified.

Figure 10:
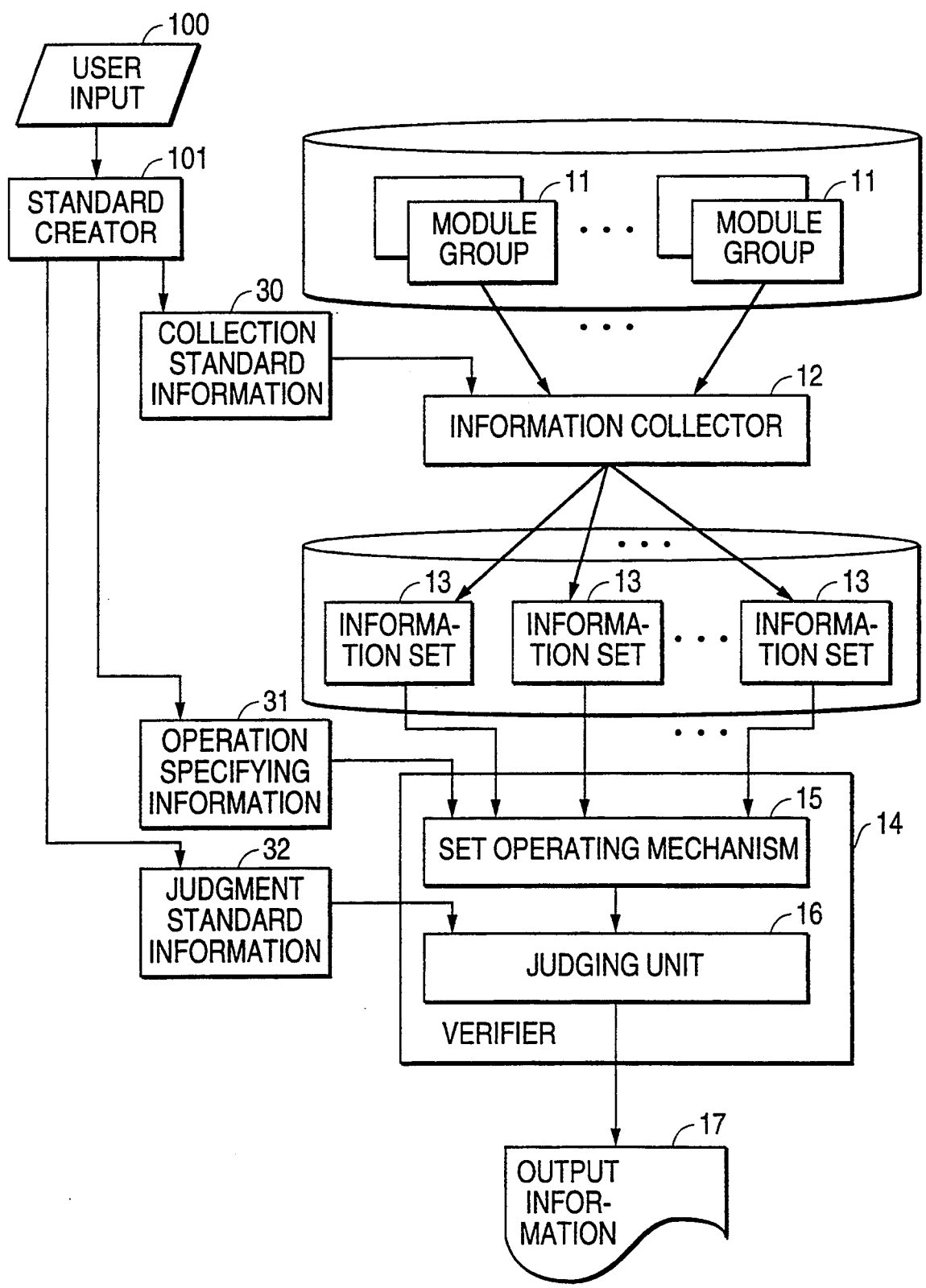
FIG. 10 is a block diagram of both an inter-module interface verification system and an intra-module interface verification system as shown in FIG. 3.

FIG. 10 shows the configuration of both an inter-module interface verification system and an intra-module interface verification system as shown in FIG. 3.

Standard Creator 101

A standard creator 101 creates from a user input 100 convergence standard information 30 of an information collection standard, operation specifying information 31 of a set operation standard, and judgment standard information 32 of a judgment standard. The algorithm for creating a standard is as follows:

(1) Read a user input 100.
(2) Analyze the user input 100.
(3) Extract from the user input 100 necessary information on the standards of an information collection, of a set operation, and of a judgment.
(4) Create respective standards according to their formats.
(5) Supply an information collection standard, a set operation standard and a judgment standard respectively to the information collector 12, the set operating mechanism 15 and the judging unit 16.

Also, it is possible to create an information collection standard, a set operation standard and a judgment standard in a step-by-step manner by sequentially inquiring of the user the standards as necessary, rather than obtaining the user input 100 in a batch.

Collection Standard Information 30

The collection standard information 30 specifies the identification data to be collected. It specifies a module (or module group) to be collected, an operation therefor and related information for each set to be generated.

Operation Specifying Information 31

The operation specifying information 31 specifies the set operation to be performed. The operation specifying information 31 can specify a basic set operation, such as A∪B, A∩B and A-B, and a complex set operation combining a plurality of such basic set operations.

Judgment Standard Information 32

The judgment standard information 32 gives information for judging the results of set operations. It specifies the judgments for predetermined set operation results. Its semantics can be specified, as necessary.

Example of User Input 100

An example of a user input 100 is shown below. It means the following.

Elements of Set A are data of the zeroth (0-th) argument for an operation set/2 appearing in Module A and Module B.

Elements of Set B are data of the zeroth (0-th) argument for an operation get/2 appearing in Module C. (In this example, the "−" sign in set operation arguments indicates that the argument value is to be ignored.)

The sum set of Set A and Set B needs to be a void set.
SET: A={x | set(x,-) ∈ (Module A ∪ Module B)}
SET: B={y | set(y,-) ∈ Module C}
RESULT: A∩B==0

When a user input 100 such as the above is obtained, the convergence standard information 30 of an information collection standard, operation specifying information 31 of a set operation standard, and judgment standard information 32 of a judgment standard are in the following formats.

Information Collection Standard (collection standard information 30)

```
BEGIN A
READ: Module A, Module B
OPERATION: set/3
DATA: ARITY(0)
END
BEGIN B
READ: Module C
OPERATION: get/3
DATA: ARITY(0)
END
```

Set Operation Standard (operation specifying information 31)

RESULT=A∩B

Judgment Standard (judgment standard information 32)

RESULT==0

Information Collector 12

Read a module for a set to be created, based on an information judgment standard. The information collector 12 judges whether or not each read set operation is specified by the information judgment standard. If it is in fact a specified set operation, the information collector 12 extracts the identification data for the target information specified by the information judgment standard. If the same identification data are not yet stored in the created set, they are newly stored therein as its new elements. If the same identification data are already stored in the created set, they are not restored therein.

The above processes are performed for all set operations of the module (or module group) specified by the information judgment standard.

By repeating the above processes for all sets specified by the information collection standard, the sets are created respectively.

Set Operating Mechanism 15

The set operating mechanism 15 performs the set operation specified by a set operation standard.

Judging Unit 16

The judging unit 16 judges whether or not a result is pursuant to the judgment standard, and produces an output accordingly.

The judging unit 16 may produce an output, such as a set operation result, a user designated comment, and so on.

FIG. 22 is a flowchart of processes performed by the judging unit 16 in FIG. 10, including both an inter-module interface verification system as shown in FIG. 3 and an intra-module interface verification system as shown in FIG. 3.

[START] After the judging unit 16 starts its judging processes, it invokes step 221.

Step 221: The judging unit 16 performs its processes for operation result(s). (Refer to FIG. 16 for further details of the processes performed in this step.) Then, the judging unit 16 proceeds to perform step 222.

Step 222: The judging unit 16 receives judgment standard information 32. Then, the judging unit 16 proceeds to perform step 223.

Step 223: The judging unit 16 evaluates the operation result(s) according to the judgment standards in the information 32. Then, the judging unit 16 proceeds to perform step 224.

Step 224: The judging unit 16 judges whether or not the operation result conforms to the judgment standards. If the judgment is affirmative (YES), the judging unit 16 proceeds to perform step 225. If the judgment is negative (NO), the judging unit 16 skips to perform step 226.

Step 225: The judging unit 16 outputs a message that the operation result conforms to the judgment standards. Then, the judging unit 16 ends its processes at [END].

Step 226: The judging unit 16 outputs a message that the operation result does not conforms to the judgment standards. Then, the judging unit 16 proceeds to perform step 227.

Step 227: The judging unit 16 outputs set element(s) of the stored operation result(s). Then, the judging unit 16 ends its processes at [END].

The following is an exemplary description of executing a verification system, utilizing the above embodiment, on a specification level.

Example of Input Module

Module A:
(1) Set the value of A(i) to Y(n).
(2) Increment "pct".
Module B:
(1) Set "Unbound" to G.
(2) Set "a reference to G" to X(n).
(3) Set "a reference to G" to A(n).
(4) Increment "pct".
(5) Increment G.
Module C:
(1) Extract the value of Y(n).
(2) Set "a reference to Y(n)" to A(i), if Y(n) is a variable.
(3) Set the value of Y(n) to A(i), unless Y(n) is a variable.
(4) Increment "pct".

Example of User Input 100

SET: A={x | set in x ∈ (module A ∪ Module B)}
SET: B={y | value of y ∈ Module C}
RESULT: PRINTOUT: A∩B Information Collection Standard (collection standard information 30)

BEGIN A
READ: Module A, Module B
OPERATION: "set"
DATA: (to)PRE
END
BEGIN B
READ: Module C
OPERATION: "the value"
DATA: (of)PRE
END Set Operation Standard (operation specifying information 31)

RESULT=A∩B

Judgment Standard (judgment standard information 32)

PRINTOUT RESULT

Sets

A={Y(n), G, X(n), A(n)}
B={(Y(n)}

Set Operation Result And Output Result

A∩B={(Y(n)}

Another Example

It is possible to do without specifying any of the information collection standard, the set operation standard, and the judgment standard, in the above embodiment. Information on those standards, i.e. collection standard information 30 for an information collection standard, operation specifying information 31 for a set operation standard, and judgment standard information 32 for a judgment standard, need not be connected together.

In a case like this, when a user input 100 specifies a default value or does not give necessary information for creating the respective standards, the standard creator 101 notifies the user of its intention to perform a processing by using a default value as the case may dictate such. The standard creator 101 supplies its internally held default values to the corresponding processors as their standard values. Alternatively, the standard creator 101 may describe a note in respective standards that they may be used as default values.

The following is an example in which respective standards indicate that a processing is performed by using a default value.

Information Collection Standard (convergence standard information 30)

BEGIN A
DEFAULT
END
BEGIN B
DEFAULT
END

Set Operation Standard (operation specifying information 31)

RESULT=DEFAULT

Judgment Standard (judgment standard information 32)

DEFAULT

It is also possible to have the information collector 12, the set operating mechanism 15 and the judging unit 16 to respectively accept corresponding parts of a user input 100, thereby enabling them to perform their operations on a realtime basis.

The interface conformance verification system shown in FIG. 4 is explained below in further detail.

Specification of Collection Range

The position specification 40 specifies the range of collecting information. The information collector 12 receives the starting and ending positions in the position specification 40 for collecting information and a module name for each set to be created. If the specified range is from the head end to the tail end of all inputted modules, the same result can be obtained as would be obtained by the inter-module interface conformance verification system shown in FIG. 1 or the intra-module interface conformance verification system shown in FIG. 2.

The following is an exemplary specification of a ranged collection.

```
BEGIN A
  READ: Module A: TOP TO CALL (func/3)
        Module B: ALL
  END
BEGIN B
  READ: Module C: = DEFINITION (func/3)
        Module B: = ALL
  END
```

This means the following.

When Set A is created, the content from the head end of Module A to a call-up of a function "func/3" and all the set operations appearing in Module B are targets of information collection.

Information Collector 12

The information collector 12 collects information, e.g. by the methods shown in the above embodiment, after skipping to the starting position for collecting information of each module specified in the collection range. The information collector 12 also judges whether or not the currently read part has reached the ending position. If it judges affirmatively, the information collector 12 stops reading; otherwise it continues collecting information.

A Document Control Information Interface Verification System

The following is a description of a document control information interface verification system, using the intra-module interface conformance verification system shown in FIG. 4.

Figure 11:
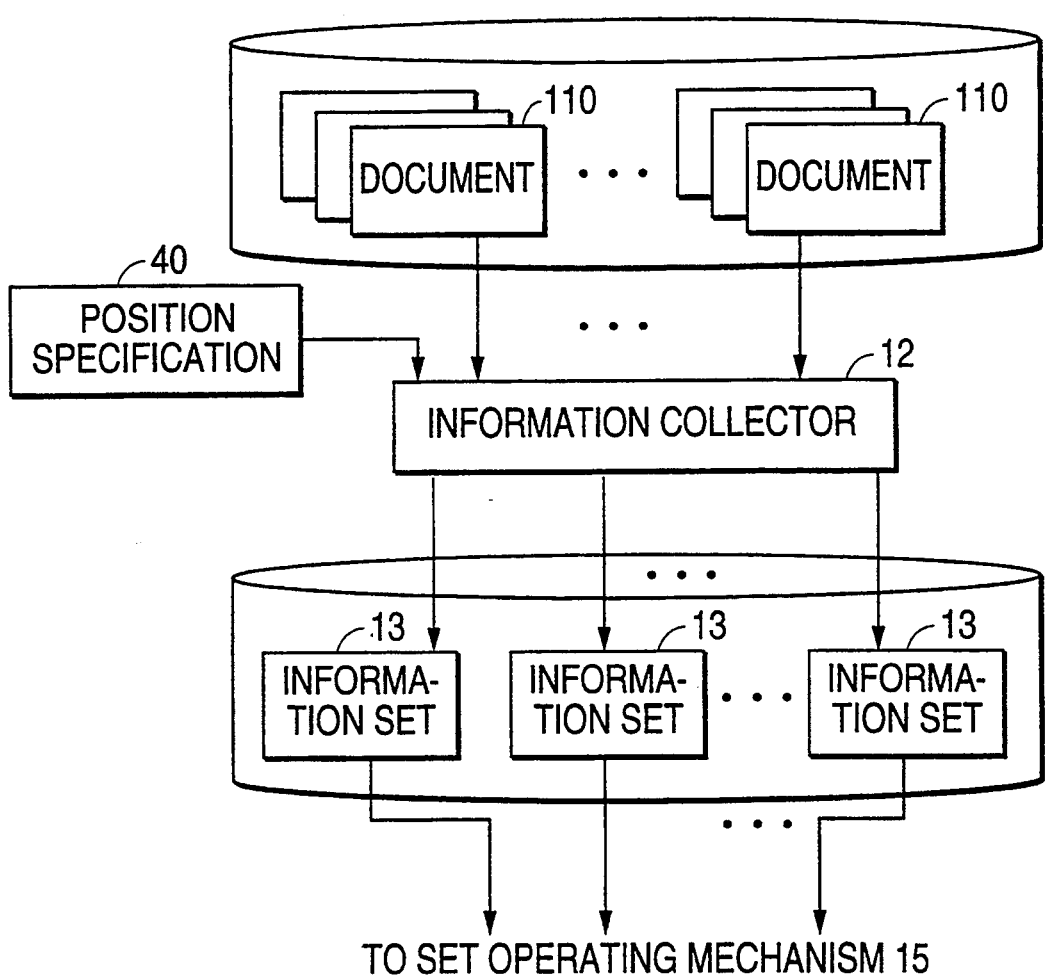
FIG. 11 is a block diagram of part of the intra-module interface verification system shown in FIG. 4.

FIG. 11 shows part of the configuration of a document creating system based on the intra-module interface verification system shown in FIG. 4.

The processing system shown in FIG. 11 is built in as a part of a document creating system. It forms a function for checking the maintenance of consistency of module sizes, fonts, hard returns, chapter numbers, and other pieces of document control information before and after a document 110C is inserted between a document 110A and a document 110B, as well as before and after a part of a continuous document is deleted from the continuous document.

The information collector 12 generates Set A as a set of document control information inputted to a document from among the entire document control information, on receiving document control information set by and in a document. The information collector 12 also generates, from the document control information inputted in and set by the document, Set B as a set of document control information to be saved at the end of editing a document and to be inputted as a part of the document.

The set operating mechanism 15 in the verifier 14 executes set operations for Set A and Set B, similarly to the earlier description. The judging unit 16 in the verifier 14 outputs the operation result and the judgment according to the set operation result as output information. The only difference in this case is that:

a common set: $C = A \cap B$
a first difference set: $D_1 = A - B$ and
a second difference set: $D_2 = B - A$ are obtained first. As long as the following conditions
$$C \neq 0, \ D_1 = D_2 = 0$$
are satisfied, there is no problem. If some other result is obtained, the judging unit 16 issues a warning that possible effects by $D_1$ and $D_2$ need to be examined.

FIG. 23 is a flowchart of processes performed by the judging unit for an intra-module document control information interface verification system as shown in FIG. 4.

[START] After the judging unit 16 starts its judging processes, it invokes step 230.

Step 230: The judging unit 16 performs its processes for an operation result C. (Refer to FIG. 16 for further detail of the processes performed in this step.) Then, the judging unit 16 proceeds to perform step 231.

Step 231: The judging unit 16 performs its processes for an operation result $D_1$. (Refer to FIG. 16 for further detail of the processes performed in this step.) Then, the judging unit 16 proceeds to perform step 232.

Step 232: The judging unit 16 performs its processes for an operation result $D_2$. (Refer to FIG. 16 for further detail of the processes performed in this step.) Then, the judging unit 16 proceeds to perform step 233.

Step 233: The judging unit 16 judges whether operation result C is a void set. If the judgment is negative (NO), the judging unit 16 proceeds to perform step 234. If the judgment is affirmative (YES), the judging unit 16 skips to perform step 236.

Step 234: The judging unit 16 judges whether or not operation results $D_1$ and $D_2$ are both void sets. If the judgment is affirmative (YES), the judging unit 16 proceeds to perform step 235. If the judgment is negative (NO), the judging unit 16 skips to perform step 237.

Step 235: The judging unit 16 outputs a message that the interface conformance is effective. Then, the judging unit 16 ends its processes at [END].

Step 236: The judging unit 16 judges whether or not operation results $D_1$ and $D_2$ are both void sets. If the judgment is negative (NO), the judging unit 16 proceeds to perform step 237. If the judgment is affirmative (YES), the judging unit 16 skips to perform step 239.

Step 237: The judging unit 16 outputs a message that the interface conformance is ineffective. Then, the judging unit 16 proceeds to perform step 238.

Step 238: The judging unit 16 outputs the stored set elements of respective operation results $D_1$ and $D_2$. Then, the judging unit 16 ends its processes at [END].

Step 239: The judging unit 16 outputs a message that the interface conformance is ineffective. Then, the judging unit 16 ends its processes at [END].

Figure 24:
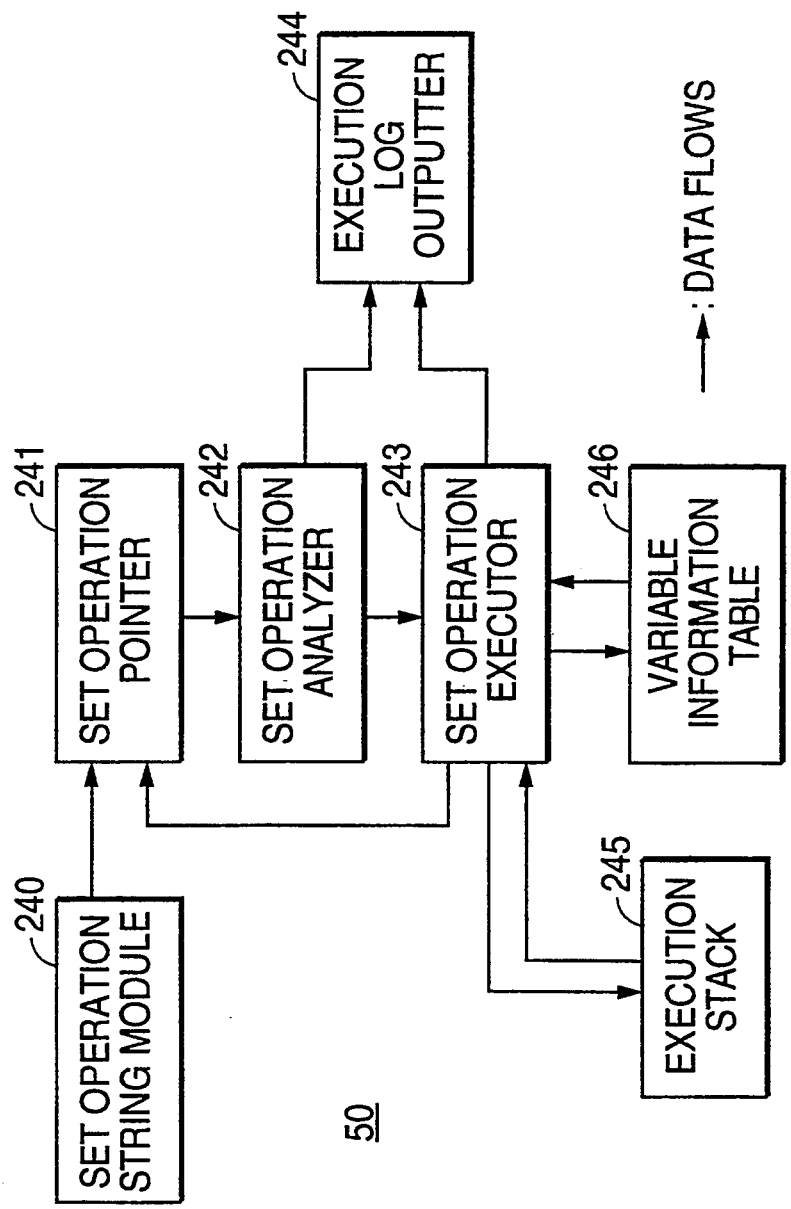
FIG. 24 is a block diagram of an executor for use in a preferred embodiment of this invention.

FIG. 24 illustrates a configuration of an executor for use in a preferred embodiment of this invention. The following is a description of an interface conformance verification system shown in FIG. 5.

Executor 50

An executor 50 executes a set operation described in a specified module (or module group), collects execution logs for the set operations executed in each unit duration of execution, and supplies them to the information collector 12.

As shown in FIG. 24, the executor 50 comprises a set operation analyzer 242 and a set operation executor 243. The executor 50 also comprises a set operation pointer 241, an execution stack 245 and a variable information table 246 for storing a variable name and its value. The executor 50 further comprises an execution log outputter 244 for outputting a result of executing a set operation.

Figure 25:
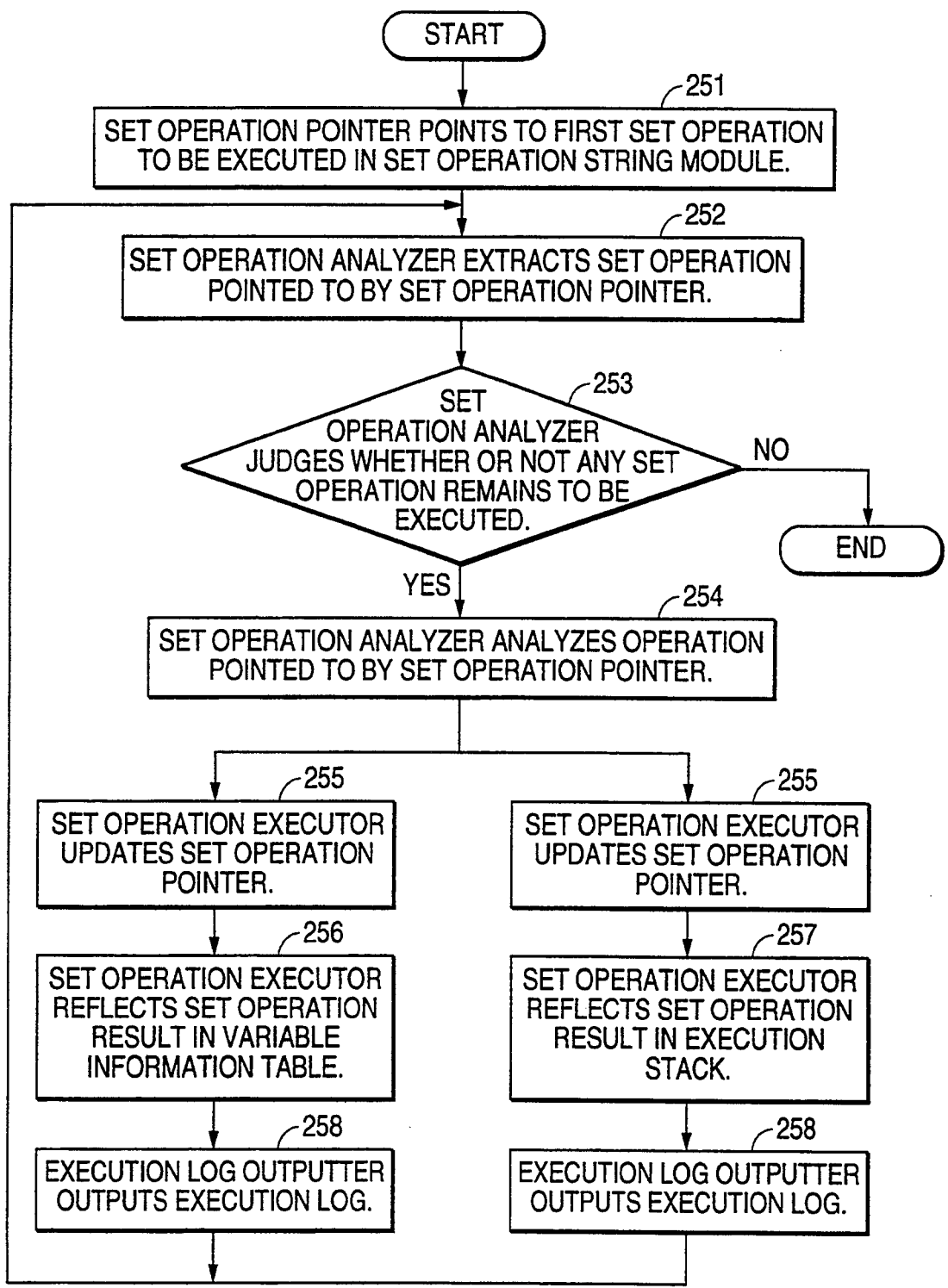
FIG. 25 is a flowchart showing the pertinent processes of the executor for use in a preferred embodiment of this invention.

FIG. 25 is a flowchart showing the pertinent processes of the executor for use in a preferred embodiment of this invention.

As shown in FIG. 25, the executor 50 performs the following procedures.

[START] After the executor 50 starts its set operations, it invokes step 251.

Step 251: The executor 50 sets the set operation pointer 241 such that it points to the first set operation to be executed in the set operation string module 240. Then, the executor 50 performs step 252.

The executor 50 repeats the rest of the processes (step 252 through step 257) until the last set operation, i.e. until the executor 50 has no more set operation to execute.

Step 252: The executor 50 has the set operation analyzer 242 extract the set operation pointed to by the set operation pointer 241. Then, the executor 50 performs step 253.

Step 253: The executor 50 has the set operation analyzer 242 judge whether or not any set operation remains to be executed. If the judgment is affirmative (YES), the executor 50 performs step 254. If the judgment is negative (NO), the executor 50 ends its processes for set operations at [END].

Step 254: The executor 50 has the set operation analyzer 242 analyze the operation pointed to by the set operation pointer 241, thereby determining the process by which the set operation executor 243 executes a set operation. The execution log outputter 244 outputs the information of the set operation executed at this time. Then, the executor 50 performs step 255.

Step 255: The executor 50 has the set operation executor 243 update the set operation pointer 241. Then, the executor 50 has the set operation executor 243 reflect the set operation result obtained by an analysis in step 254 by performing step 256 or 257.

Step 256: When the executed set operation is a processing for a variable, the set operation executor 243 reflects the set operation result to the variable information table 246. Then, the executor 50 performs step 258.

Step 257: When the executed set operation is a processing for an execution control, the set operation executor 243 reflects the set operation result to the execution stack 245. Then, the executor 50 performs step 258.

Step 258: The executor 50 has the execution log outputter 244 output an execution log. Then, the executor 50 reverts to step 252 to perform the rest of the steps in a loop form.

A conventional tracer may be used for realizing the executor 50.

Execution Log

The following is an example of an execution log.
1: Module A(1): main(argc, argv) {
2: Module A(6): if(1<argc) {
3: Module A(7): func A(num, argv, &argument);
4: Module B(1): func A(num, argv, argument_p) {
5: Module B(5): for(i=1;
6: Module B(6): i<num; i++) {
7: Module B(10): return(1)
8: Module A(8): func B(num, argument)

Information Collector 12

The information collector 12 establishes a correspondence between an execution log and an executed module (module group), collects predetermined identification data (variable names in this case), creates a correspondence table 51 for storing the correspondence, and creates a set whose elements comprise the identification data.

Information Set 13

The following is an example of an information set created by the information collector 12.

Here, Set A represents a set whose elements comprise set variable names, and Set B represents a set whose elements comprise reference variable names.

A = {argc, argv, num, argument_p, i, ... }
B = {argc, num, argv, i, argument, ... }

Correspondence Table 51 argv: A(1), B(2), ...

| | |
|---|---|
| argv: | A(1), B(3), .... |
| num: | B(3), A(4), B(6), B(8), .... |
| argument_p: | A(4), .... |
| i: | A(5), B(6), .... |
| argument: | B(8), .... |
| | .... |

Judging Unit 16

The set operating mechanism 15 has obtained the following:
$C_1 = A-B = \{argument\_p, ...\}$
$C_2 = B-A = \{argument, ...\}$
$C_3 = A \cap B = \{argc, argv, num, i, ...\}$ FIG. 26 is a flowchart of processes performed by the judging unit for both an inter-module interface verification system and an intra-module interface verification system as shown in FIG. 5.

[START] After the judging unit 16 starts its judging processes, it invokes step 261.

Step 261: The judging unit 16 performs its processes for an operation result $C_3$. (Refer to FIG. 16 for further detail of the processes performed in this step.) Then, the judging unit 16 proceeds to perform step 262.

Step 262: The judging unit 16 loads information stored in the correspondence table 51 into set elements. Then, the judging unit 16 proceeds to perform step 263.

Step 263: The judging unit 16 groups respective elements by predetermined attributes: by variables in this case. Then, the judging unit 16 proceeds to perform step 264.

Step 264: The judging unit 16 evaluates respectively grouped elements. It compares the timing of setting with the timing of reference in this case. Then, the judging unit 16 proceeds to perform step 265.

Step 265: The judging unit 16 judges whether or not grouped elements match desired results. If the judgment is negative (NO), the judging unit 16 skips to perform step 267. If the judgment is affirmative (YES), the judging unit 16 proceeds to perform step 266.

Step 266: The judging unit 16 outputs a message that the interface conformance is ineffective. Then, the judging unit 16 ends its processes at [END].

Step 267: The judging unit 16 outputs a message that the interface conformance is ineffective. Then, the judging unit 16 proceeds to perform step 268.

Step 268: The judging unit 16 outputs the stored set elements of respective operation results. Then, the judging unit 16 ends its processes at [END].

The judging unit 16 obtains the following information from the correspondence table 51 for respective elements of set $C_3$:

| | |
|---|---|
| argc: | A(1), B(2), .... |

```
argv: A(1), B(3), ....
num: B(3), A(4), B(6), B(8), ....
  i: A(5), B(6), ....
     ....
```

Thus, the judging unit 16 issues a warning message by judging that a variable "num" is referenced before it is actually set.

Variant Form (1)

Although the information collector 12 creates a set whose elements comprise the names of the variables in a program, which are used as identification data in the above embodiment, elements of a set need not be names of variables. A similar effect can be obtained by creating a set whose elements comprise identifiers of meaningful data, such as a database, an array, another data structure, and so forth, instead of creating a set whose elements comprise names of variables.

Variant Form (2)

Although the information collector 12 collects information based on a description in a program or a specification in the above embodiment, the information collector 12 can collect information based on addresses in a memory allocated during a program execution.

Variant Form (3)

Although there is only one information collector 12 in the above embodiment, there could be more than one information collector 12 respectively for collecting pieces of information, thereby creating sets concurrently.

As described above, this invention enables effects of a module on a system or other modules, differences between a specification of a module and an actual processing program, and interfaces between modules in a designing stage for a system comprising a plurality of modules to be easily verified, thereby contributing greatly to the efficient development of a large scale system.

What is claimed is:

1. An interface conformance verification system for verifying by a computer inter-module interface conformance of a verification target, for a plurality of modules readable by the computer, said interface conformance verification system comprising:
   information collecting means for receiving at least one module group made up of at least one module, for collecting, as identification data, pieces of target information on at least one predetermined module operation, and for creating at least two sets, each having elements formed by the identification data; and
   verifying means for verifying inter-module interface conformance, said verifying means including
      set operating means for receiving the at least two sets created by said information collecting means and for performing at least one predetermined set operation on the at least two sets to produce a result, and
      judging means for outputting the result of the at least one predetermined set operation to indicate a relation between corresponding set operations of at least two of the modules.

2. The interface conformance verification system according to claim 1,
   wherein said information collecting means comprises:
      means for receiving collection standard information defining a standard of information collection and at least one user-defined module operation, and
      means for collecting the pieces of target information on each user-defined module operation;
   wherein said set operating means in said verifying means comprises:
      means for receiving operation specifying information defining the at least one predetermined set operation and for receiving the at least two sets created by said information collecting means, and
      means for performing the at least one predetermined set operation specified by the operation specifying information; and
   wherein said judging means in said verifying means comprises:
      means for receiving judgment standard information defining a judgment standard and for receiving the result of the at least one predetermined set operation, and
      means for outputting a judgment result indicating a relation between corresponding set operations, based on the judgment standard and the result of the at least one predetermined set operation.

3. The interface conformance verification system according to claim 1, wherein said information collecting means comprises:
   means for receiving a position specification specifying a range of information to be collected in one of each module and each module group,
   means for collecting the pieces of target information on the at least one predetermined module operation within the range, and
   means for creating each set having elements formed by the identification data.

4. The interface conformance verification system according to claim 1,
   further comprising executing means for executing the at least one predetermined module operation in the modules and for outputting an execution log,
   wherein said information collecting means comprises means for adding a corresponding execution log to the identification data to be collected,
   wherein said set operating means performs a plurality of predetermined set operations, and
   wherein said judging means in said verifying means comprises means for making judgments on respective elements of the at least two sets obtained as the result of the predetermined set operations performed by said set operating means, and for outputting a resultant relation between the predetermined set operations.

5. An interface conformance verification system for verifying by a computer intra-module interface conformance of a verification target in at least one module readable by the computer, said interface conformance verification system comprising:
   information collecting means for receiving at least one module, for collecting as identification data pieces of target information on at least one predetermined module operation, and for creating a plurality of sets, each for the at least one predetermined module operation, having elements formed by the identification data; and verifying means for verifying intra-module interface conformance, said verifying means including set operating means for receiving at least two of the sets created by said information collecting means and for performing at least one predetermined set operation on the at least two of the sets to produce a result, and judging means for outputting the result of the at least one predetermined set operation to indicate a relation between corresponding set operations within the at least one module.

6. The interface conformance verification system according to claim 5, wherein said information collecting means comprises means for receiving collection standard information defining a standard of information collection and at least one user-defined module operation, and means for collecting the pieces of target information on each user-defined module operation, and for creating a plurality of sets whose elements comprise said identification data];

wherein said set operation means in said verifying means comprises:

means for receiving operation specifying information defining the at least predetermined set operation and for receiving the at least two sets created by said information collecting means, and means for performing the at least one predetermined set operation specified by the operation specifying information; and wherein said judging means in said verifying means comprises:

means for receiving judgment standard information defining a judgment standard and for receiving the result of the at least one predetermined set operation, and means for outputting a judgment result indicating a relation between corresponding set operations, based on the judgment standard and the result of the at least one predetermined set operation.

7. The interface conformance verification system according to claim 5, wherein said information collecting means comprises:

means for receiving a position specification specifying a range of information to be collected in one of each module and each module group, means for collecting the pieces of target information on the at least one predetermined module operation within the range, and means for creating each set having elements formed by the identification data.

8. The interface conformance verification system according to claim 5, further comprising executing means for executing the at least one predetermined module operation in the at least one module and for outputting an execution log, wherein said information collecting means comprises means for adding a corresponding execution log to the identification data to be collected, wherein said set operating means performs a .plurality of predetermined set operations, and wherein said judging means in said verifying means comprises means for making judgments on respective elements of the at least two of the sets obtained as the result of predetermined set operations performed by said set operating means, and for outputting a resultant relation between the predetermined set operations.

9. A system for verifying that machine-readable documents meet standards associated therewith, comprising:

a computer memory to store at least one document group including at least one document; and a processor, operatively connected to the computer memory, to obtain at least two sets of verification data representing the contents of the at least one document group by analyzing the at least one document group using selection criteria, to perform at least one set operation on the at least two sets to produce at least one result and to compare the at least one result with judgment standards to determine whether the at least one document meets the judgment standards.

10. A method of verifying that machine-readable documents meet standards associated therewith, comprising the steps of:

(a) reading in a computer memory at least one document group including at least one document;

(b) analyzing in a data processor the at least one document group to obtain at least two sets of verification data representing contents of the at least one document group which meet selection criteria;

(c) performing at least one set operation in the data processor on the at least two sets to produce at least one result; and (d) comparing the at least one result with judgment standards to determine whether the at least one document meets the judgment standards.

* * * * *

UNITED STATES PATENT AND TRADEMARK OFFICE
CERTIFICATE OF CORRECTION

PATENT NO. : 5,355,479 Page 1 of 2
DATED : October 11, 1994
INVENTOR(S) : Satoru TORII et al.

It is certified that error appears in the above-indentified patent and that said Letters Patent is hereby corrected as shown below:

Title page, item [57], col. 2,
In the ABSTRACT, line 22, after "operations" insert --.-- and delete "judgment" and insert --Judgment-- therein.

Column 4, line 46, after "a" insert --call statement or--; and (1st occurrence)

line 47, delete "call statement or".

Column 5, line 32, after "a" insert --(-- and after "variable" delete ":" and insert --;-- therein.

Column 6, line 38, after "stimulating" delete "its".

Column 7, line 17, delete "A".

Column 10, line 56, delete "A".

Column 13, line 66, after "system" insert --as--.

Column 18, line 1, delete "And" and insert --and--.

UNITED STATES PATENT AND TRADEMARK OFFICE
CERTIFICATE OF CORRECTION

PATENT NO. : 5,355,479

DATED : October 11, 1994

INVENTOR(S) : Satoru TORII et al.

It is certified that error appears in the above-indentified patent and that said Letters Patent is hereby corrected as shown below:

Column 25, line 22, after "data" delete "]"--.

Signed and Sealed this

Twenty-eight Day of March, 1995

Attest:

BRUCE LEHMAN

Attesting Officer        Commissioner of Patents and Trademarks